United States Patent
Wheeler et al.

(10) Patent No.: US 6,738,759 B1
(45) Date of Patent: May 18, 2004

(54) SYSTEM AND METHOD FOR PERFORMING SIMILARITY SEARCHING USING POINTER OPTIMIZATION

(75) Inventors: David B. Wheeler, Austin, TX (US); Matthew J. Clay, Austin, TX (US)

(73) Assignee: Infoglide Corporation, Inc., Austin, TX (US)

( * ) Notice: Subject to any disclaimer, the term of this patent is extended or adjusted under 35 U.S.C. 154(b) by 187 days.

(21) Appl. No.: 09/611,673

(22) Filed: Jul. 7, 2000

(51) Int. Cl.[7] .................................................. G06F 7/00
(52) U.S. Cl. ................................ 707/3; 707/7; 715/513
(58) Field of Search ............................ 707/5, 102, 101, 707/6, 7, 2, 3; 715/514, 513

(56) References Cited

U.S. PATENT DOCUMENTS

| | | | | |
|---|---|---|---|---|
| 5,297,039 A | * | 3/1994 | Kanaegami et al. | 704/10 |
| 5,537,586 A | * | 7/1996 | Amram et al. | 707/3 |
| 5,619,709 A | * | 4/1997 | Caid et al. | 704/9 |
| 5,740,421 A | * | 4/1998 | Palmon | 707/100 |
| 5,768,580 A | * | 6/1998 | Wical | 707/102 |
| 5,784,539 A | * | 7/1998 | Lenz | 706/45 |
| 5,875,446 A | * | 2/1999 | Brown et al. | 345/970.1 |
| 5,970,496 A | * | 10/1999 | Katzenberger | 707/102 |
| 5,974,412 A | * | 10/1999 | Hazlehurst et al. | 707/3 |
| 6,026,398 A | * | 2/2000 | Brown et al. | 707/5 |
| 6,038,561 A | * | 3/2000 | Snyder et al. | 707/6 |
| 6,052,693 A | * | 4/2000 | Smith et al. | 707/102 |
| 6,112,203 A | * | 8/2000 | Bharat et al. | 707/5 |
| 6,233,575 B1 | * | 5/2001 | Agrawal et al. | 707/6 |
| 6,236,988 B1 | * | 5/2001 | Aldred | 707/102 |
| 6,279,007 B1 | * | 8/2001 | Uppala | 707/101 |
| 6,285,999 B1 | * | 9/2001 | Page | 707/5 |
| 6,360,227 B1 | * | 3/2002 | Aggarwal et al. | 707/102 |
| 6,389,436 B1 | * | 5/2002 | Chakrabarti et al. | 707/3 |
| 6,393,427 B1 | * | 5/2002 | Vu et al. | 707/100 |
| 6,453,315 B1 | * | 9/2002 | Weissman et al. | 707/5 |
| 6,470,306 B1 | * | 10/2002 | Pringle et al. | 704/3 |
| 6,505,205 B1 | * | 1/2003 | Kothuri et al. | 707/100 |
| 2001/0034694 A1 | * | 10/2001 | Elias | 705/37 |
| 2002/0023097 A1 | * | 2/2002 | Ripley | 707/200 |
| 2002/0040363 A1 | * | 4/2002 | Wolfman et al. | 707/5 |

OTHER PUBLICATIONS

Frisse Mark. Searching for Information in a Hypertext Medical Handbook; ACM 7/98 vol. 31 No. 7 p. 880–886.*
□□Salton G, McGill M J: "The SMART and SIRE Experimental Retrieval Systems", in Readings in Information Retrieval (ed. K S Jones, P Willett), pp 381–399, Morgan Kaufman Publishers, San Francisco 1997.*
M. Gyssens, J. Paredaens, and D. Van Gucht. A grammar–based approach towards unifying hierarchical data models. In Proc. ACM SIGMOD, pp. 263–272, 1989.*

* cited by examiner

*Primary Examiner*—Kim Vu
*Assistant Examiner*—Monplaisir Hamilton
(74) *Attorney, Agent, or Firm*—Taylor Russell & Russell, P.C.

(57) ABSTRACT

The present invention is a computer-implemented method for optimizing the detecting and scoring of similarities between documents in a source database and search criteria. It uses a set of hierarchical documents having root, interior and leaf nodes where the leaf nodes contain data items. Unique identifiers are assigned to each unique data item contained within each leaf node within the set of documents. Unique identifiers may be assigned to the data items depending upon a selected context in the hierarchy of nodes within the documents. For each data item in each leaf node, a data item score is computed that represents a similarity between the data item in the leaf node and the search criteria. A parent nodes score is then computed by combining the data item scores for all its child nodes. A data and indexing structures provides for efficient similarity searching and the quick reporting of results because the data is organized by the categories a user wants to search. Assigning a pointer or unique identifier only to unique data items causes the memory requirements to be reduced and optimizes the search time. Depending upon the particular set of documents being searched and the search criteria, significant improvements in speed and memory requirements may be achieved.

57 Claims, 43 Drawing Sheets

26

| Database Editor [Known Offenders] | | | | |
|---|---|---|---|---|
| - Known Offenders | | Properties | Import Maps | Diagnostics |
| Primary Key | ⇧ | - Display Settings | | |
| - Person | | Color (Background) | ☐ White | |
| - Name | ⇩ | | | |
| Honorarium | | Color (Text) | ■ Black | |
| First | | | | |
| Middle | | Visible | √ | |
| Last | | | | |
| Suffix | + | - General Settings | | |
| - Address | | Allow multiple | ☐ | |
| Street | — | | | |
| City | | Author | | |
| State | | | | |
| Zip | | Collapse | ☐ | |
| - Description | | Data type | Schema (SCHEMA) | |
| Eye Color | | | | |
| Hair Color | | Description | Known Offenders | |
| - Relative(s) | | | | |
| - Name | | Field name | KNOWN_OFFENDERS | |
| First | | - SSE Settings | | |
| Middle | | | | |
| Last | | Default rollup style | Sum | |
| | | Default weight | 0% | |

FIGURE 2

| Document Editor [Known Offenders] | |
|---|---|
| Question | Answer |
| - Known Offenders | |
|    Primary Key | |
| - Person | |
| -   Name | |
|      Honorarium | Mr. |
|      First | John |
|      Middle | Q. |
|      Last | Public |
|      Suffix | |
| -   Address | |
|      Street | 123 Main St. |
|      City | Anytown |
|      State | Texas |
|      Zip | 12345-6678 |
| -   Description | |
|      Eye Color | Brown |
|      Hair Color | Brown |

FIGURE 3

| Document Query [Untitled] | | | | |
|---|---|---|---|---|
| Query | Output | Filer | | |
| Question | | Search Value | Measure | Weight |
| - Known Offenders | | | | 0% |
| Primary Key | | | String Difference | 100% |
| - Person | | | | 100% |
| - Name | | | | 100% |
| Honorarium | | | String Difference | 0% |
| First | | John | Name | 30% |
| Middle | | | Name | 10% |
| Last | | Public | Name | 60% |
| Suffix | | | String Difference | 0% |
| - Address | | | | 100% |
| Street | | 123 Main Ave | Street Address | 30% |
| City | | | Name | 30% |
| State | | | State | 20% |
| Zip | | | String Difference | 20% |
| - Description | | | | 100% |
| Eye Color | | | Exact | 100% |
| Hair Color | | | Exact | 100% |

FIGURE 4A

| Document Query [Untitled] | | |
|---|---|---|
| Query | Output | Filter |
| Order | | Question |
| √ | 1 | \Known Offenders\Primary Key |
| | 2 | \Known Offenders\Person\Name\Honorarium |
| √ | 3 | \Known Offenders\Person\Name\First |
| | 4 | \Known Offenders\Person\Name\Middle |
| √ | 5 | \Known Offenders\Person\Name\Last |
| | 6 | \Known Offenders\Person\Name\Suffix |
| | 7 | \Known Offenders\Person\Address\Street |
| √ | 8 | \Known Offenders\Person\Address\City |
| | 9 | \Known Offenders\Person\Address\State |
| | 10 | \Known Offenders\Person\Address\Zip |
| | 11 | \Known Offenders\Person\Description\Eye Color |
| | 12 | \Known Offenders\Person\Description\Hair Color |

FIGURE 4B

Relation Bands

| Parent Score Computing Algorithm | | | | | |
|---|---|---|---|---|---|
| Single Best | Greedy Sum | Overall Sum | Greedy Minimum | Overall Minimum | Overall Maximum |
| From the children score buffers in the matrix, select the single largest score | Select largest score first, second largest to N largest and sum the results | Select scores from matrix such that $S_1+S_2+...S_N$ is maximal | Select smallest score first, second smallest to N smallest and sum the results | Select scores from matrix such that $S_1+S_2+...S_N$ is minimized | Select maximum score from the set of scores that maximizes the overall sum |
| 240 | 241 | 242 | 243 | 244 | 245 |

FIGURE 20

Database

| | RID | | RID | | | RID |
|---|---|---|---|---|---|---|
| Incident | 1 | Suspect | 1 | Height: | 6' 0" | 1 |
| | | | | Weight: | 200 | 1 |
| | | | | Hair color: | Brown | 1 |
| | | Victim | | First Name: | John | 1 |
| | | | | Last Name: | Jones | 2 |
| | | | | Address: | 123 Main St. | |
| | | Crime | | Date: | 1/1/99 | |
| | | | | Location: | Alley | |
| | | | | Type: | Robbery | |
| | | | | Description: | Victim was emptying trash | |
| Incident | 2 | Suspect | 2 | Height: | 5' 11" | 2 |
| | | | | Weight: | 210 | 2 |
| | | | | Hair color: | Light Brown | 2 |
| | | Victim | | First Name: | Tom | 3 |
| | | | | Last Name: | Lee | 4 |
| | | | | Address: | 594 Rose St. | |
| | | Crime | | Date: | 6/1/99 | |
| | | | | Location: | Street | |
| | | | | Type: | Assault | |
| | | | | Description: | Victim was walking on street | |
| Incident | 3 | Suspect | 3 | Height: | 5' 11" | 2 |
| | | | | Weight: | 150 | 3 |
| | | | | Hair color: | Black | 3 |
| | | Victim | | First Name: | John | 1 |
| | | | | Last Name: | Thomas | 5 |
| | | | | Address: | 624 First St. | |
| | | Crime | | Date: | 8/1/99 | |
| | | | | Location: | Parking garage | |
| | | | | Type: | Robbery | |
| | | | | Description: | Victim was exiting garage on foot | |

FIGURE 21A

| Search Criteria | | |
|---|---|---|
| Incident | Suspect | Height: 5' 11" |
| | | Weight: 220 |
| | | Hair color: Brown |

Data Band for Incident / Suspect / Height

Relation Band for Incident / Suspect / Height

Relation Band for Incident / Suspect

| Score Buffer | Type of Scoring (Measure) | Band Incident/Suspect | Search Criteria |
|---|---|---|---|
| ① | Contrast Range (5' 9", 6' 1") | Height | 5' 11" |
| ② | Contrast Range (200, 240) | Weight | 220 |
| ③ | Compare Exact | Hair color | Brown |

FIGURE 21F

|  | RID 1 | RID 2 | RID 3 |
|---|---|---|---|
| 1  Score Buffer  Height | 0.75 | 1.0 |  |
| 2  Score Buffer  Weight | 0.4 | 0.9 | -0.2 |
| 3  Score Buffer  Hair color | 1.0 | 0 | 0 |
| 4  Score Buffer  Suspect | 0.716 | 0.633 | 0.266 |
| 5  Score Buffer | 0.716 | 0.633 | 0.266 |

FIGURE 21G

Compute Parent Score

| Score Buffer | Type of Parent Score Algorithm | Band | Score Buffer ID | Weighting |
|---|---|---|---|---|
| ④ | Overall Sum | Incident/Suspect Height | ① | 1/3 |
| ④ | Overall Sum | Incident/Suspect Weight | ② | 1/3 |
| ④ | Greedy Sum | Incident/Suspect Hair color | ③ | 1/3 |
| ⑤ | Single Best | Incident/Suspect | ④ | — |

FIGURE 21H

Data Band for Incident / Suspect / Height for Database (FIGURE 21I)

Suspect RID

Relation Band for Suspect / Height

Relation Band for Incident / Suspect

|  | RID 1 | RID 2 | RID 3 | RID 4 | RID 5 |
|---|---|---|---|---|---|
| Score Buffer 1 | 0.75 | 1.0 | | | |
| Score Buffer 2 | 0.4 | 0.9 | -0.2 | | |
| Score Buffer 3 | 1.0 | 0 | 0 | 0 | |
| Score Buffer 4 | 0.716 | 0.633 | 0.266 | 0.716 | 0.883 |
| Score Buffer 5 | 0.716 | 0.633 | 0.266 | 0.883 | |

FIGURE 21M

| SBS Document Compare | | | |
|---|---|---|---|
| Question | Anchor | Score | 1 |
| - Known Offenders | | 29.56% | |
| Primary Key | 003 | 33.33% | 001 |
| - Person | | 25.78% | |
| - Name | | 55.00% | |
| Honorarium | | | Mr. |
| First | John | -50.00% | John |
| Middle | Q | 100.00% | Q |
| Last | Public | 100.00% | Public |
| Suffix | | | |
| - Address | | 22.34% | |
| Street | 123 Anystreet | 65.91% | 123 Main St |
| City | Anycity | 61.88% | Anytown |
| State | Florida | | Texas |
| Zip | 35729 | 20.00% | 78729 |
| - Description | | | |
| Eye Color | Brown | | Brn |
| Hair Color | Black | | Brn |

FIGURE 25

SYSTEM AND METHOD FOR PERFORMING SIMILARITY SEARCHING USING POINTER OPTIMIZATION

TECHNICAL FIELD OF THE INVENTION

The present invention relates generally to similarity search engines. More particularly, the invention is a computer-implemented similarity search system and method that allows for efficiently searching very large source databases for similarity search criteria specified in a query. A database, a document or set of documents comprising the data to be searched are translated into a hierarchical database, document or set of documents of root, interior and leaf nodes that correspond to the categories that a user wants to search. The leaf nodes contain the data items to be searched. A unique identifier, called a pointer, is assigned to each unique data item within a specified context. An index associates each child node with its parent. During the similarity search, data items within the leaf nodes are assigned a score that is a quantitative measurement of the similarity between the object and the search criteria. A scoring algorithm, which may be selected by the user, assigns the similarity score. The data and indexing structures provide for efficient similarity searching and the quick reporting of results because the data is organized by the categories a user wants to search. Assigning a pointer or unique identifier only to unique data items causes the memory requirements to be reduced and optimizes the search time. Depending upon the particular set of documents being searched and the search criteria, significant improvements in speed and memory requirements are achieved. Leaf node scores are combined into its parent scores according to an algorithm, which may be specified by the user. Leaf node or child scores within a parent may be weighted so that certain child categories may be given more importance when leaf nodes (child) scores are combined into parent scores. The invention can be utilized for searching most types of large-scale databases.

BACKGROUND

Modern information resources, including data found on global information networks, form huge databases that need to be searched to extract useful information. Existing database searching technology provides the capability to search through these databases. However, traditional database search methods usually provide precise results, that is, either an object in the database meets the search criteria and belongs to the results set or it does not. However, in many cases it is desirable to know how similar an object is to the search criteria, not just whether the object matches the search criteria. This is especially important if the data in the database to be searched is incomplete, inaccurate or contains errors such as data entry errors or if confidence in the search criteria is not great. It is also important to be able to search for a value or item in a database within its particular data context to reduce the number of irrelevant "matches" reported by a database searching program. Traditional search methods of exact, partial and range retrieval paradigms fail to satisfy the content-based retrieval needs of many emerging data processing applications.

Existing database searching technology is also constrained by another factor: the problem of multiple data sources. Data relevant to investigations is often stored in multiple databases or supplied by third party companies. Combining the data by incorporating data from separate sources is usually an expensive and time consuming systems integration task. However, if a consistent ranking or scoring scheme is used for identifying how similar an object is to the search criteria, then that same search criteria can be used to rank other objects in the same search categories in multiple databases. By using a consistent ranking or scoring scheme, it is possible not only to know how similar the object is to the search criteria, but also how similar objects are to each other and then be able to choose the best match or matches for the search criteria from multiple database sources.

Existing database searching, including similarity searching technologies for searching databases, particularly-very large databases, may also take an unacceptably long period of time to complete any search due to the large quantity of data and the particular search techniques used. The amount and quantity of data being searched today, both in traditional database searching and when searching for information located throughout or accessed through a global communications network such as the Internet requires optimized search techniques to provide users with fast as well as accurate search results.

SUMMARY

The present invention, which is a system and method for performing similarity searching, solves the aforementioned needs.

The present invention is a computer implemented method for optimizing similarity searching while detecting and scoring similarities between documents and a search criteria using a set of hierarchical documents having root, interior and leaf nodes where the leaf nodes contain data items. Using assigned unique identifiers assigned to each unique data item contained within each leaf node in the set of documents, a data item score is computed for each data item in each leaf node that represents a similarity between the data item in the leaf node and the search criteria.

A root node is a node that has no parent node and is a parent of at least one child node selected from the group consisting of interior nodes and leaf nodes. An interior node has a parent node and the interior node is itself a parent node having at least one child node selected from the group consisting of interior nodes and leaf nodes. A leaf node is a child node that has no children and the leaf node has a parent node selected from the group consisting of root nodes and interior nodes.

A parent node score is computed by combining the data item scores for all its child nodes. The data item score is a number that represents how similar and dissimilar the data item is to the search criteria. The method further comprises computing an interior node score for all interior nodes by combining the scores for all the child nodes of the interior nodes. The method further comprises computing a root node score by combining the interior node scores for the children of the root node.

The method further comprises a schema having a hierarchy, wherein the schema describes an organization of the set of hierarchical documents. The schema defines a hierarchy of parent and child nodes within the set of hierarchical documents. A node label is assigned to each node in the schema.

The method further comprises converting at least one document into at least one hierarchical document having root, interior and leaf nodes, wherein said root, interior and leaf nodes correspond to the nodes of the schema. The method further comprises converting at least one document into at least one hierarchical document having at least one root node and at least one leaf node, wherein said root and leaf nodes correspond to the nodes of the schema. Converting the documents comprises allowing a user to map between the schema and documents in a preexisting database to form the set of hierarchical documents. The preexisting database may be a relational database. The hierarchical documents are stored in Extensible Markup Language (XML).

The assigned unique identifiers for each unique data item contained within each leaf node are unique within a selected context in the set of hierarchical documents. The context for a node may be its position in the schema or the set of node labels that comprise its position in the schema.

The method further comprises reserving space in a score buffer for each assigned unique identifier and associating the score for the data item for each assigned unique identifier with its reserved space in the score buffer. The score buffer may be indexed by the data item's assigned unique identifier. The assigned unique identifier may be the same for all identical data items for a selected context within the hierarchical database. The context may be selected from the group consisting of its position in the schema and the set of node labels.

The method comprises assigning an identifier to each parent node and identifying the child nodes belonging to each parent node. Identifying comprises associating the data item's assigned unique identifier for each leaf node with its parent's assigned identifier and saving the resulting association. The resulting association may be stored in a relation band.

The score may be assigned based on a method selected from the group consisting of an algorithmic scoring method and a non-algorithmic scoring method. The scoring method may be a non-algorithmic scoring method and if the data item does not match the search criteria, the score assigned is a value that represents a neutral score. The method further comprises if a non-algorithmic scoring method is chosen a set of data values along with data item scores is generated. If a data item occurs within this set, the data item's unique identifier is associated with its corresponding score. If the data items are not in this set, the data items are assigned a neutral score. The non-algorithmic scoring method uses a user-defined table of data items, their corresponding synonyms and their scores.

The method further comprises for all the data items in the set of hierarchical documents, organizing each data item in a data band according to its position in the schema and associating each data item's assigned unique identifier with the data item and storing the association in the data band and for each child node in the set of hierarchical documents, linking each node with its parent node using a relation band according to its position in the schema, where the parent node is selected from the group consisting of interior nodes and root nodes.

Computing a data item score comprises calculating a leaf node score for each data item within each leaf node, combining all the data item scores within the leaf node into an overall leaf node score and saving the overall node score as the leaf node score which may be stored in a score buffer. The method further comprises indexing the leaf score buffer by the data item's assigned unique identifier.

The method further comprises using the saved leaf node scores, selecting a parent node as the current parent node and calculating a current parent node score for all leaf nodes that have the same parent using a parent score computing algorithm and saving the current parent node score. If the current parent node is a root node, the parent node score is saved as a final similarity search score and processing ends. If the current parent node is an interior node, the processing comprises saving the current parent node score as an interior node score, setting the current parent node to the parent of the interior node, using the saved interior node scores, calculating the parent node score for all interior nodes that have the same parent using a parent score computing algorithm and repeating the process until the current parent node is a root node.

The method further comprises calculating a root node score for each root node within the set of hierarchical documents comprising using the relation bands, for 1 to N parent nodes, identifying the data item scores for their child nodes of the 1 to N parent nodes; selecting a current parent node from the 1 to N parent nodes; computing a parent score for the current parent node using the data item scores of its children and a parent score computing algorithm and saving the parent node score. If the current parent node is a root node, saving the parent node score as the similarity search score and processing ends. If the current parent node is not a root node, selecting another current parent node from the 1 to N parent nodes that has not had its score calculated and repeating the process until the current parent node is a root node.

The method further comprises for all data items in the set of hierarchical documents, organizing each data item within each leaf node in a data band according to its position in the schema and associating each data item's assigned unique identifier with the data band. Computing a data item score comprises calculating a leaf node score for each data item, combining all the data item scores within the leaf node into an overall leaf node score and saving the overall node score as the leaf node score.

The method further comprises selecting a leaf node data item score for a leaf node that has not had its parent node score computed and calculating a current parent node score for the selected leaf node's parent using leaf node scores for all children of the parent. A parent score computing algorithm is used to calculate the score and the current parent node score is saved. If the current parent node is a root node, the parent node score is saved as a final similarity score and processing ends. Otherwise, beginning with a lowest level of interior nodes in a schema, processing comprises for each interior node: saving the current parent node score as an interior node score, setting the current parent node to the parent of the interior node, using the saved interior node scores, calculating the parent node score for all interior nodes that have the same parent and repeating the process until the current parent node is a root node.

The parent score computing algorithm comprises determining the weight to be given to each leaf node score in calculating the current parent node score. The parent score computing algorithm may be selected from the group consisting of single best, greedy sum, overall sum, greedy minimum, overall minimum and overall maximum.

Computing a data item score comprises using a search criteria, comparing each data item to the search criteria and assigning a data item score that represents a degree of similarity between the search criteria and the data item.

The schema may be defined by a user or retrieved from a database containing stored schemas. The schema further comprises a scoring method for calculating a leaf node score for each leaf node, a weighting algorithm for calculating a parent node score for each leaf node when the parent node contains more than one leaf node and a parent score computing algorithm for computing the similarity score of the parent node using the leaf node scores and the weighting algorithm. The search criteria may be dynamically defined by a user or retrieved from a database of stored queries.

The method further comprises using the same search criteria and repeating the process for each of N number of hierarchical documents or sets of hierarchical documents.

The present invention comprises computer-readable media having computer-executable instructions for performing the methods as above.

BRIEF DESCRIPTION OF THE DRAWINGS

These and other features, aspects and advantages of the present invention will become better understood with regard to the following description, appended claims and accompanying drawings where:

FIG. 2 is an example of a graphical user interface for defining a schema.

FIG. 3 shows an example of a graphical user interface displaying a document that has been organized according to the schema of FIG. 2.

FIG. 4a shows an example of the creation of a query using a graphical user interface.

FIG. 4b shows an example of a portion of a query that specifies the fields of the database that are returned to the user with the similarity search score.

FIG. 20 is a table listing parent score computing algorithms and their respective processing.

FIG. 21a shows an example of a database containing three incidents.

FIG. 21b is an example of search criteria from a schema initiated by user.

FIG. 21c shows the data bands created for Incident/Suspect/Height for the database entries of FIG. 21a.

FIG. 21f shows the commands for scoring methods and parent object scoring algorithms input by the user into the schema.

FIG. 21g shows the resulting similarity-search scoring.

FIG. 21h shows the commands for parent object scoring.

FIG. 21m shows the resulting similarity search scores.

FIG. 25 shows an example of a graphical user interface displaying the results of a document comparison similarity search.

DETAILED DESCRIPTION OF THE DRAWINGS

Figure 1:
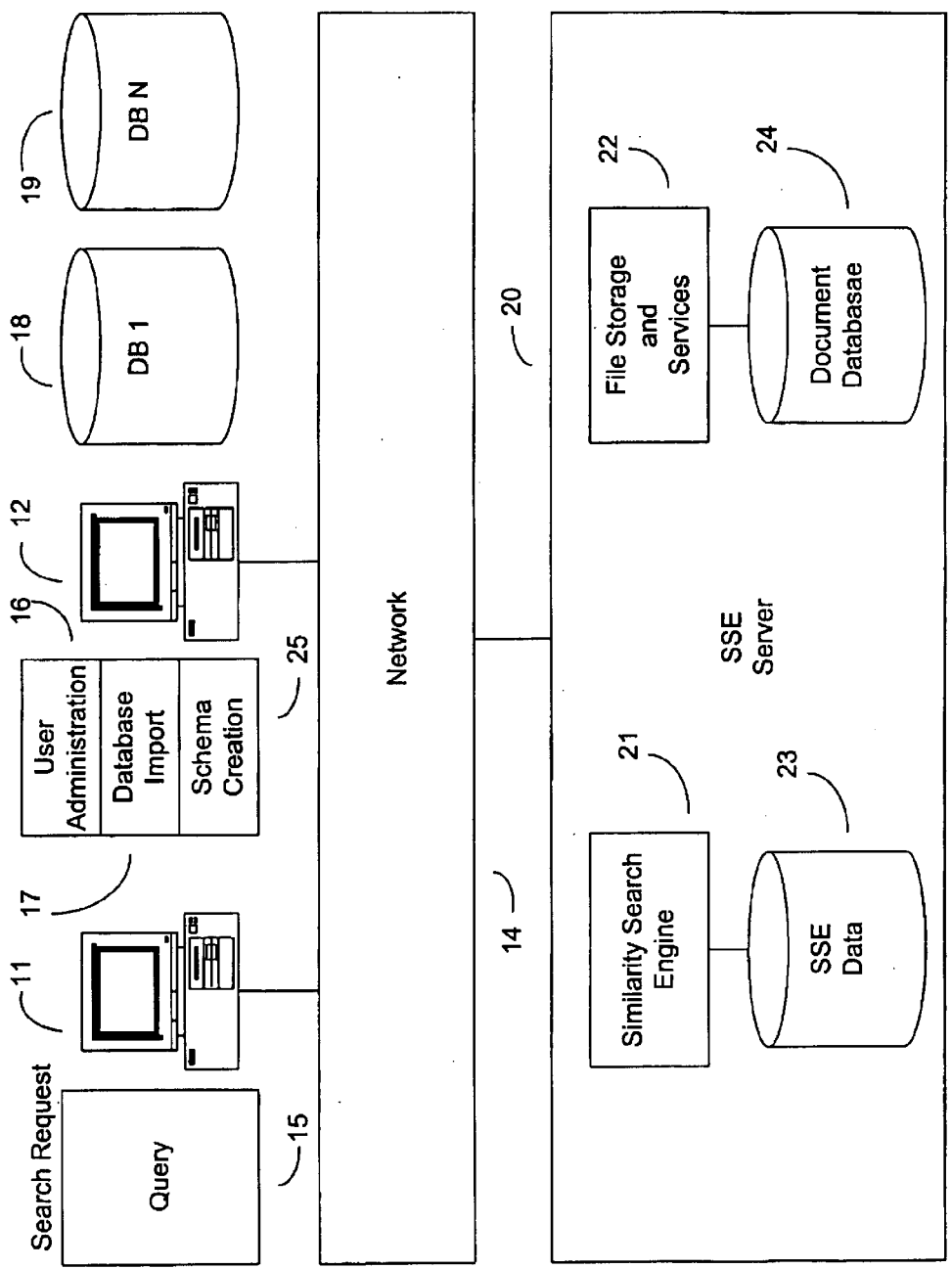
FIG. 1 is a system architecture diagram of the similarity search engine computer system illustrating a client-server configuration.

Prior to the detailed description of the figures, a brief discussion and definition of terms used in the present invention is provided.

Similarity searching is the process of determining how similar or dissimilar data are to a user's search criteria. In the present system, the data to be similarity searched (interchangeably called the source data, database, document or set of documents) are assigned a numerical score that is a quantitative measure of the similarity between the data and search criteria. The data to be similarity searched may be entered by the user may be in a single stored document or may be embodied in a database containing many documents. Throughout the description of the drawings, it is assumed that the database contains multiple documents to be searched, however, similarity searching can also be done on a single document. Similarity searching may also be done on data that is entered by the user, rather than data that has been previously stored in a database. Most databases that contain information that a user wants to search are relational databases, however the present system provides for searching of all types of databases by allowing the user to map between the categories to be searched and the fields of the source database. The present invention translates the data to be searched, whether it is entered by the user or stored in a relational database, into a hierarchical form and stores that data in hierarchical database, which has a tree-type structure with parent and child objects or nodes on the tree. The tree-type structure may be organized into a hierarchy of parent and child nodes that are root, interior and leaf nodes. A root node is a nodes that has no parent and the root nodes is a parent of at least one child node which may be an interior node or a leaf node. An interior node has a parent node and the interior node is itself a parent nodes having at least one child node, which may be an interior or a leaf node. A leaf node is a child node that has no children and the leaf node has parent node, which may be either a root node or an interior node. The leaf nodes contain the data items that are to be similarity searched and assigned a similarity search score that represents how similar or dissimilar the data item is to the search criteria.

In the present system, the hierarchical database is stored in a data description language called Extensible Markup Language (XML) together with indexing structures called bands. XML is a World Wide Web consortium standard that allows for the creation of tags that identify data. XML encapsulates data inside custom tags that carry semantic information about the data. The tags describe each piece of data. Since the tagging categories may be standardized, XML facilitates the interchange of data. Other languages, besides XML that support and model data hierarchically can also be used.

A schema is a model of the problem domain. It contains only structural and other kinds of meta-data. A schema associated with hierarchical documents exists to give us a roadmap to be able to understand the hierarchical organization of the document. It forms a series of parent and child relationships or categories arranged in a hierarchical tree-type structure (of root, interior and child nodes) that correspond to the objects in the database or document that the user is interested in similarity searching. For example, a simple schema that defines a person could have person as a root node with interior nodes of name, address and description. The interior nodes could then have leaf nodes that contain the actual data. The interior nodes name could have leaf nodes honorarium, first name, middle initial, last name and description. Another schema could contain attorney names and another could contain physician names. The schema does not contain the actual data items to be searched but simply represents the hierarchy of the data to be searched. Within the hierarchy of the schema, a data band is created for each leaf node on the schema tree. A data band represents all data items in a particular category that exist in the database or document to be searched. When the actual data items are translated into a hierarchical document or set of documents that will be searched, each data item will be stored in a leaf node and each leaf node has an associated data band. Each piece of data in each data band is assigned a unique identifier (also called a relative identifier (RID)) that may be unique only within their specific context within the schema.

The context for a piece of data may be thought of as its position in the schema. Using the schema, the context tells you the path through the tree from any node to the root node. Therefore, each node in the tree may be thought of as having a context. Context allows us to distinguish between different uses of data of the same type. For a particular type of data, such as a name, there may be many contexts. For example, name can be an attorney's name or a physician's name. The context allows us to make these divisions. Contexts can be sensitive or insensitive. For example, a data band may consist of all last names (Last Names) in a set of documents which would be stored in leaf nodes. This would be an example of a context insensitive organization of all last names. In this case, a unique assigned identifier is assigned to each unique name in the data band comprising Last Names. However, contexts may also be sensitive. For example, the context may be represented as Physicians/Last Names or a separate context of Attorneys/Last Names with both of these being context sensitive organizations. In this case, a unique assigned identifier could be assigned to each unique name in the data band that forms the context comprising Physicians/Last Names. Alternatively, an identifier could be assigned to all last names in a context insensitive mode. A unique assigned identifier would be assigned to each unique name in the data band that forms the separate context Attorneys/Last Names. The data bands assigned according to the schema contain only the data structure, not the source data to be similarity searched. A relation band, which also can be thought of as an index, is created for each link between a child node (which may be an interior and leaf node) and its immediate parent in the schema. A relation band is used to connect the child to the parent to determine its context.

The schema chosen or generated by the user is used to translate and structure the data to be searched into a hierarchical form when a source data in the form of a database, document or set of documents are imported into the system. The user can map between fields of the source data and the categories in the schema. Alternatively, the user can create a new document using the schema categories and enter the data to be searched. The schema describes and structures the unpopulated data bands. When the data is imported to form a hierarchical document, set of documents or database, the data imported is mapped into bands according to the schema. A data band represents all items in a particular category that exist in the database or document to be searched. Each piece of data in a data band is assigned a relative identifier (RID) that is unique only within their specific context. A relation band is used to connect the child data to the parent data. FIGS. 12a through 12g, which are discussed in detail below, illustrate the concept of data and relation bands. The schema allows the user to specify the search criteria for similarity searching and "scoring" documents for similarity. The schema specifies the search categories, a scoring algorithm (called a measure) used to determine the type of similarity score to be given to the source data objects, and a parent score computing algorithm (also called a choice algorithm or score summing algorithm) for determining how to compute the similarity scores for the their parent objects using the scores from the child objects. The schema also includes a weighting value that determines the relative weight given to child objects that have the same parents when combining the similarity scores for children that have the same parent. That weighting is used together with the parent score computing algorithm to sum the similarity scores for the source data child objects into their parent objects.

A query is the actual search request containing the search criteria. It is usually dynamically specified by the user, but can also be a previously generated stored query. Once the query is entered, the similarity search scores are assigned, the parent scores are computed from their children and report results are generated.

FIG. 1 is a system architecture diagram of the similarity search engine computer system illustrating a client-server computer configuration. The computing system 10 comprises one or more general-purpose computers 11 and 12 interconnected by a network 14. The network connects the general purpose computers 11 and 12 to one or more similarity search engine (SSE) server computers 20. The network 14 may be, but is not limited to, the Internet, a Wide Area Network (WAN), a Local Area Network (LAN) or a wireless network. The SSE server computer 20 contains a similarity search engine SSE 21 and file storage and services system 22. The SSE server 20 may include a SSE database 23 and a document database 24 utilized by the file storage and services system 22. Alternatively, the SSE server 20 may be connected to the SSE database 23 and the document database 24 that are located external to the SSE server 20.

The graphical user interface of the general purpose computers 11 and 12 is utilized to create a search hierarchy (called a schema) 25, to request the import of a database to be similarity searched 17, to define a query 15 and for user administrative functions 16. A schema is a set of statements that model the problem domain. The schema forms a series of parent and child relationships or categories arranges in a hierarchical tree type structure that corresponds to the objects in the source database that the user is interested in similarity searching. A user, via the graphical user interface, may define the schema or it may be a default schema previously saved on disk. FIG. 2 shows an example of a graphical user interface for defining a schema. The left-hand portion of the screen 26 shows the hierarchical similarity search question set for a similarity search for known offenders. Known offender is the parent object or category. Below the parent object are the child objects of person (who are known offenders) and relative. The person object contains the child object's name, address and description. The relative object consists of the child object's name, which in turn has child objects first, middle and last names. Each object is assigned a data type, either according to a system default or by the user. The core data types assigned include text (used for all objects that have no children), folder (used with all question with children), multiple choice (used for questions with a list of predefined answer options), primary key (internal data type to uniquely represent a document) and binary (used for all non-textual data, such as images or sound clips). Users can modify certain default settings for these data types, but cannot delete the data types. The core data types may be inherited or extended from parent objects to children. Inheriting or extending a data type means the child inherits the properties of its parent. New properties and modification of properties are allowed for the child, but properties that originate in the parent or any ancestor cannot be changed or removed. Data types allow the user to logically group a set of questions together in the schema, give that grouping a name and thereby imply a meaning. Once the grouping is defined, the user is able to search against a similar group structure. Once the data type name has been defined and included in the schema, other databases and schemas can also be searched. For example, if the data type name (having a first middle and last name) is defined, it can be used to search for names in another database.

In FIG. 2, known offenders is the root node, person and relative are interior nodes, name, address and description are interior nodes. Honorarium, first, middle last and suffix are leaf nodes having as a parent the name node which in turn has a parent node person. Street, city, state and zip are leaf nodes having as a parent the address node that in turn has a parent node person. A data band is created for all the leaf nodes and the data items in the leaf nodes are the items that are similarity searched and scored.

Once the schema has been defined, the user can import documents to be similarity searched. In order to facilitate similarity searching, the documents are organized using the hierarchy of the schema. Most documents to be searched exist in relational databases. It is necessary to translate the relational database to a hierarchical database and this is done utilizing the schema that the user has created. The hierarchy of a document remains consistent with its schema. FIG. 3 shows an example of a GUI displaying a document that has been organized according to the known offender's schema of FIG. 2. The data in the document is the name, address, and eye color and hair color of a known offender and has been organized utilizing the known offender data types of the schema of FIG. 2.

After the schema has been defined and the relational database converted to a hierarchical database utilizing the data types of the schema, a query can be generated by the user at the graphical user interface of the general purpose computer (11 of FIG. 1). The query allows the user to specify the search criteria for similarity searching and "scoring" documents for similarity. FIG. 4a shows an example of the creation of a query using the graphical user interface of the general-purpose computer (11 of FIG. 1). In FIG. 4a, the user wants to find a person named "John Q. Public" having an address as shown. FIG. 4b shows part of the query that specifies the fields of the database that are to be returned to the user with the similarity score. In this case as indicated by the check marks, the user wants the document primary key, which identifies the document, the first and last name of the person and the person's city returned to the user. This may be returned in the form of a display, a printout or data saved in a report database. The query may contain a number of other fields, including the number of documents to return. Details of the query and its processing are discussed below.

Figure 5:
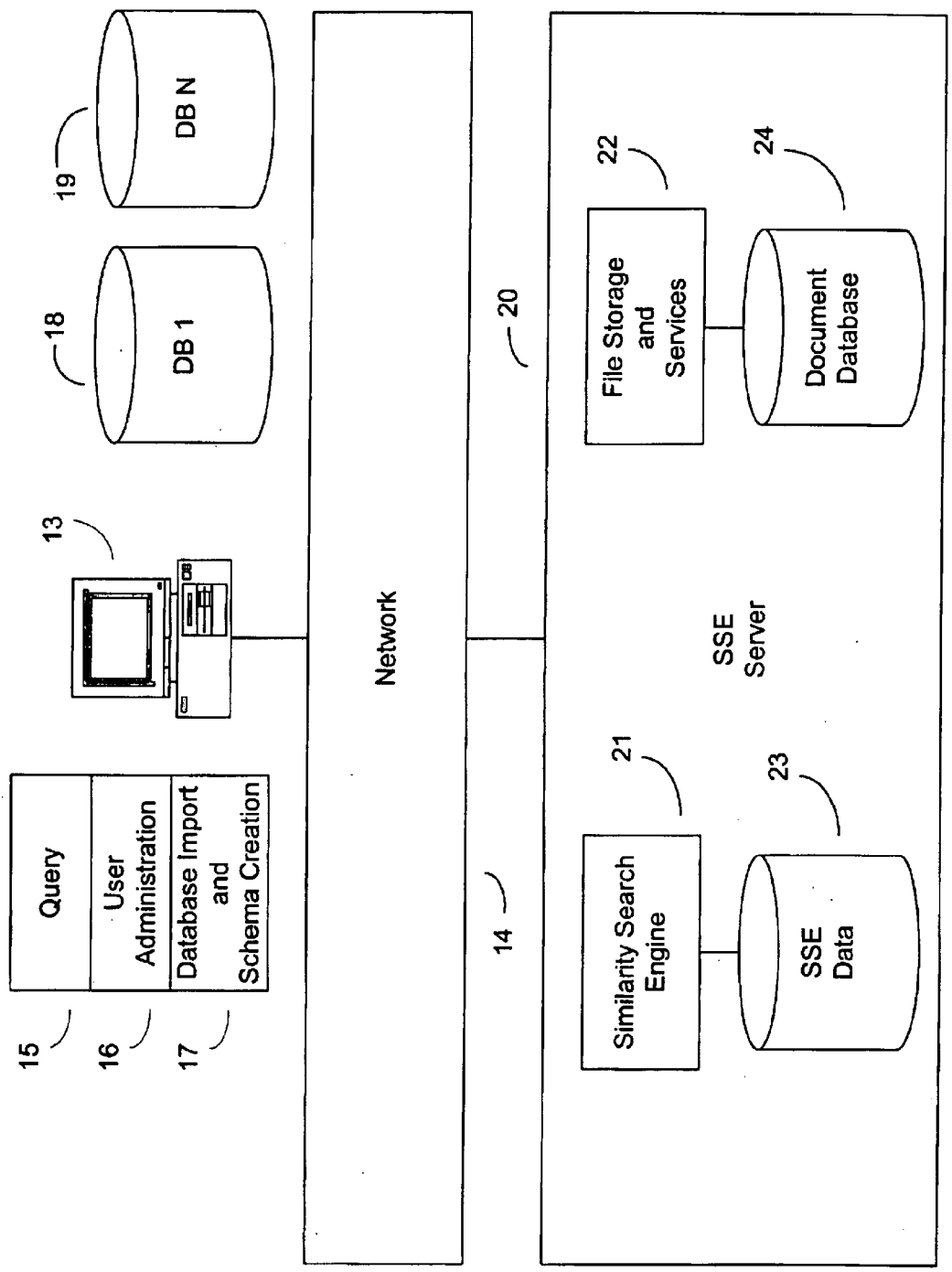
FIG. 5 is a system architecture diagram of the similarity search engine computer system illustrating a single client computer configuration.

Turning back to FIG. 1, once the schema 25, database to import 17 and query 15 are generated at the client computers (11 and 12), they are sent to the similarity search engine (SSE) server 20. Alternatively, the query function 15, user administration function 16 and database import 17 and schema creation functions 25 may be executed in a single client computer as shown in FIG. 5. FIG. 5 is a system architecture diagram of the SSE computer system 20 of the similarity search engine illustrating another embodiment of the client-server computer configuration, the query 15, user administration 16, database import and schema creation functions 17 are executed on a single computer 13. In the client-server networked computer configuration, they are sent via the network 14.

Figure 6:
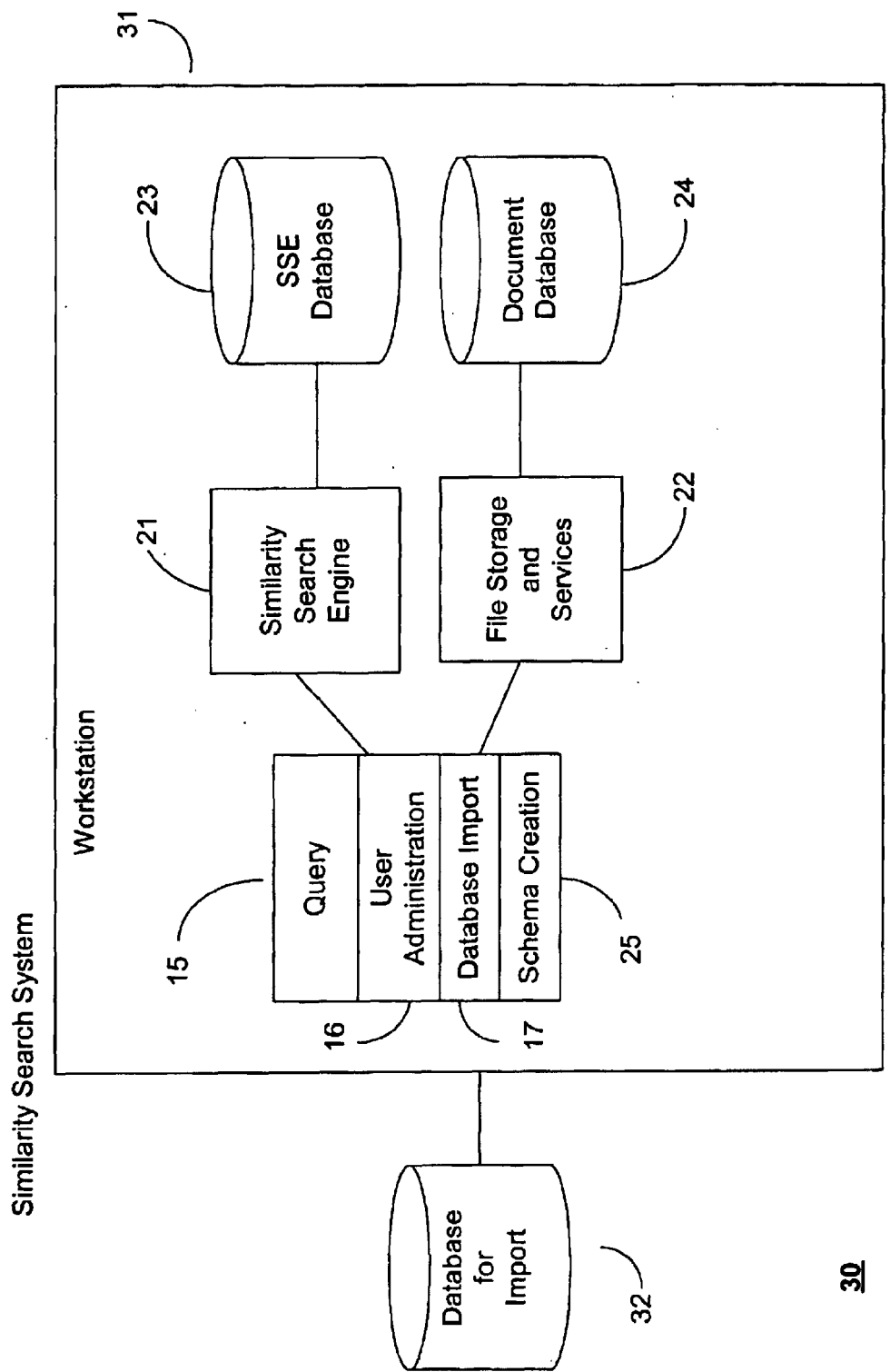
FIG. 6 shows a system architecture diagram of the similarity search system in a standalone computer configuration.

FIG. 6 shows a system architecture diagram of the similarity search system in a standalone computer configuration. The similarity search system 30 comprises a workstation 31 containing the query 15, user administration 16, database import 17 and schema creation functions 25 along with the similarity search engine SSE 21, file storage and services system 22, SSE data 23 and document database 24. A database 32, containing the data to be imported for search by the query, may be external to the system. Alternatively, the SSE database 23 and the document database 24 may be located external to the work station 31.

Figure 7:
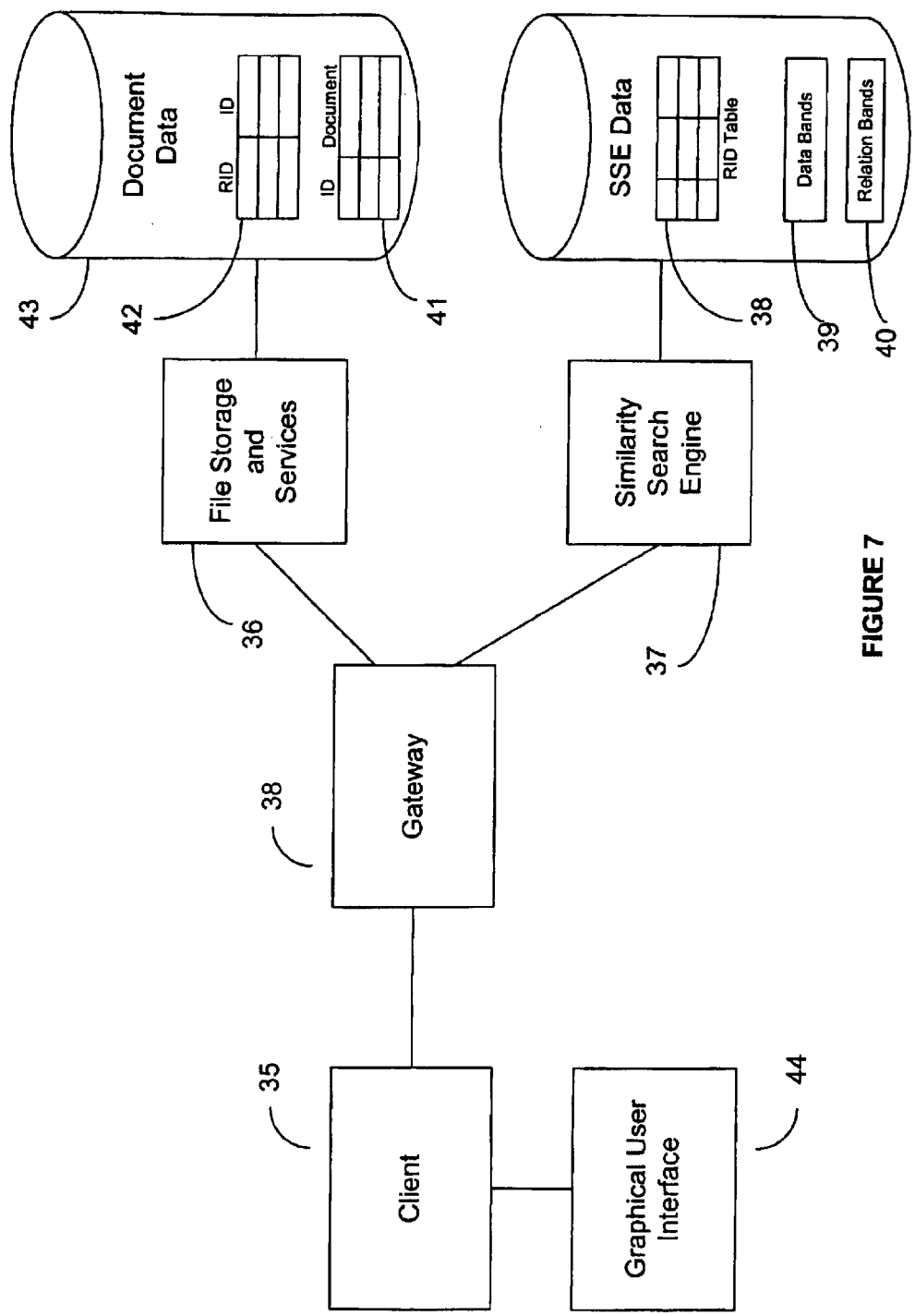
FIG. 7 shows a block diagram of the similarity search system.

FIG. 7 shows a block diagram of the similarity search system. The client 35 interfaces with the file storage and services (FSS) 36 and the similarity search engine (SSE) 37 via a gateway 38. The gateway receives commands from the client 35 (which are entered via the client's graphical user interface 44) and search results from the SSE 37, routes the commands and search results and performs any necessary translations of the command and search results. In one version of the present system, the client 35 translates the client command, which may be a query, a user administrative function, document import or schema creation command, and any associated data into a data description language, called Extensible Markup Language (XML). The XML data description language is helpful in allowing users to model data hierarchically. The command, as translated into XML, is then compiled into micro-commands within SSE 37. The SSE 37 performs a number of functions including compiling the commands, assigning relative identification numbers (called RIDs and also called unique assigned identifiers) to new data to be searched, maintaining an RID table 38, organizing the data to be searched into data bands 39 according to the categories to be searched, relating child data with parent data using relation bands 40, executing the query according to the algorithm chosen by the user, scoring the results from the query and combining the child scores into the parent scores according to an algorithm chosen by the user. The file storage and services function (FSS) 36 creates and stores document data 43. The document data includes the data to be searched using the query. In one embodiment, the FSS 36 creates a document table 41 to store the imported documents. The FSS 36 creates a unique assigned identifier (also called RID)/identification table 42 that maps between the unique assigned identifiers which are assigned and used by the SSE 37 and the system document ID which is the primary key used throughout the rest of the system and by the user to identify a document. Alternatively, the FSS may include a mapping back to the relational database imported by the user. In another embodiment, the RID/identification table 42 may be stored in the SSE data and created by either the FSS 36 or the SSE 37.

Figure 8:
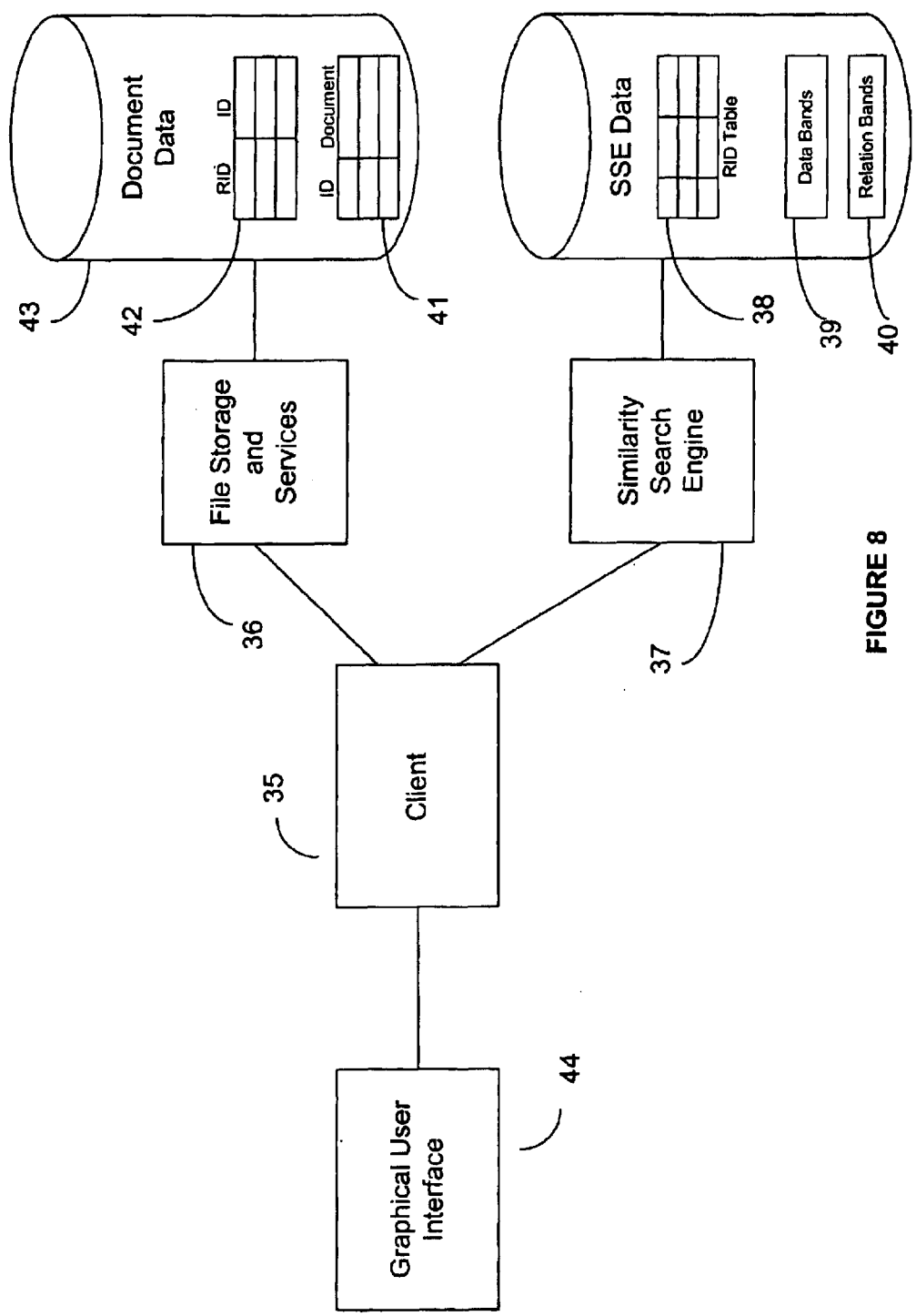
FIG. 8 shows a system architecture diagram of the similarity search system in a standalone computer configuration.

FIG. 8 shows a system architecture diagram of the similarity search system in a standalone computer configuration. The architecture is similar to that shown in FIG. 7, with the exception that the gateway 38 is not present. The client machine 35 interfaces directly with the FSS 36 and the SSE 37. As discussed in FIG. 7, in another embodiment, the RID/identification table 42 may be stored in the SSE data and created by either the FSS 36 or the SSE 37.

Figure 9:
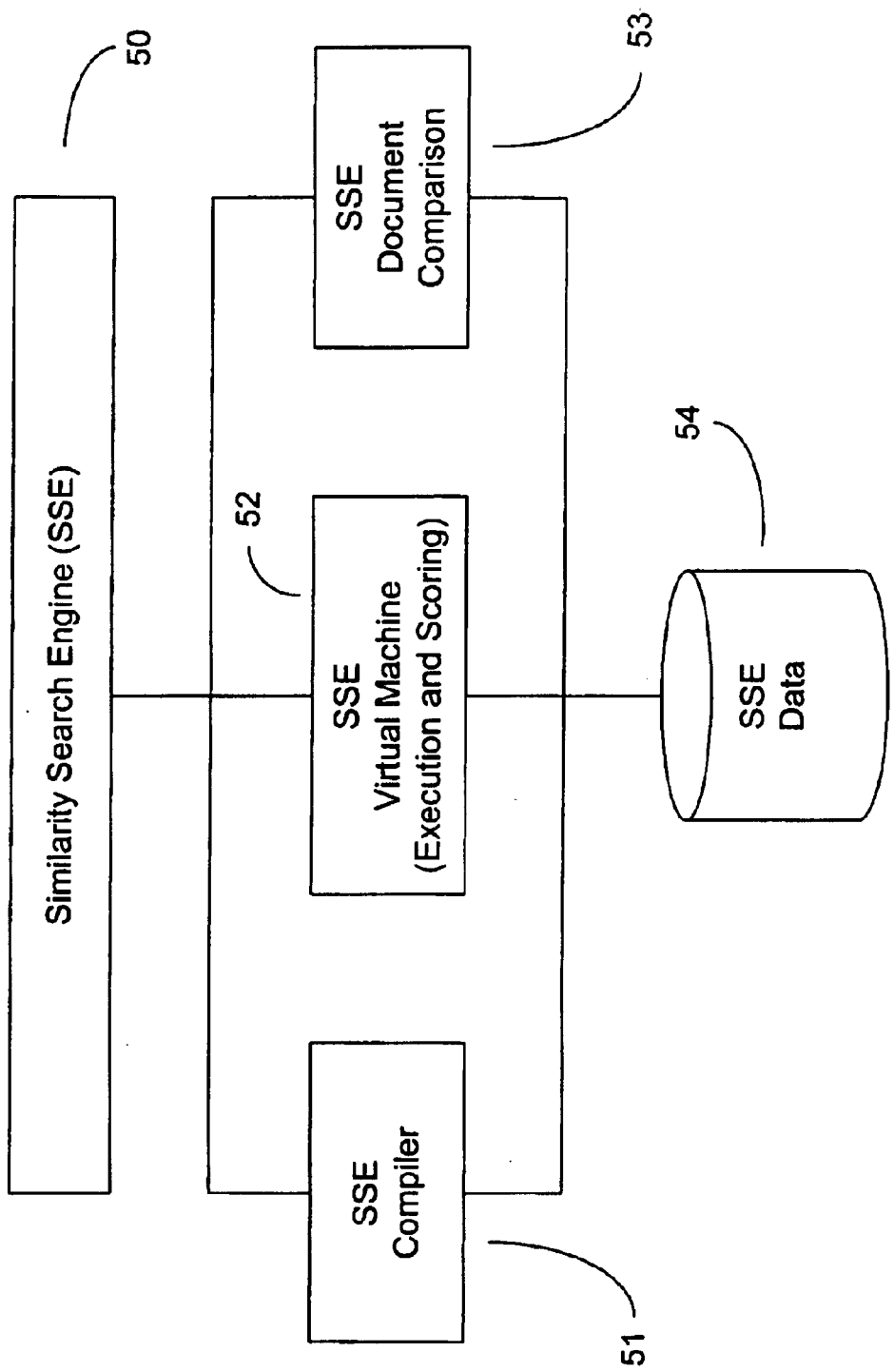
FIG. 9 is a block diagram of the similarity search engine.

FIG. 9 is a block diagram of the similarity search engine (SSE) 50. The SSE has three major components: SSE compiler 51, SSE virtual machine for execution and scoring 52 and SSE document comparison function 53.

When a command is received from the client, a check is first made to determine the type of command. If the command is a document compare type of query request, the SSE sends the command to the SSE document comparison function 53. The document comparison function 53 processes a query command that request documents be compared. The document comparison function incorporates score ranking similarity and similarity/dissimilarity matching to identify patterns in searches. It provides for the ability to rapidly analyze documents in a side-by-side fashion.

If the command schema creation command or document related command such as write, update and delete or a query execution command and is not a document compare command, the SSE compiler 51 takes the command and compiles it into SSE commands that can be executed by the SSE virtual machine execution and scoring function 52. The SSE virtual machine executes all commands with the exception of document compare query requests. The SSE data 54 contains the unique assigned identifiers (RIDs), data band and relation band data used by the SSE virtual machine 52.

Figure 10:
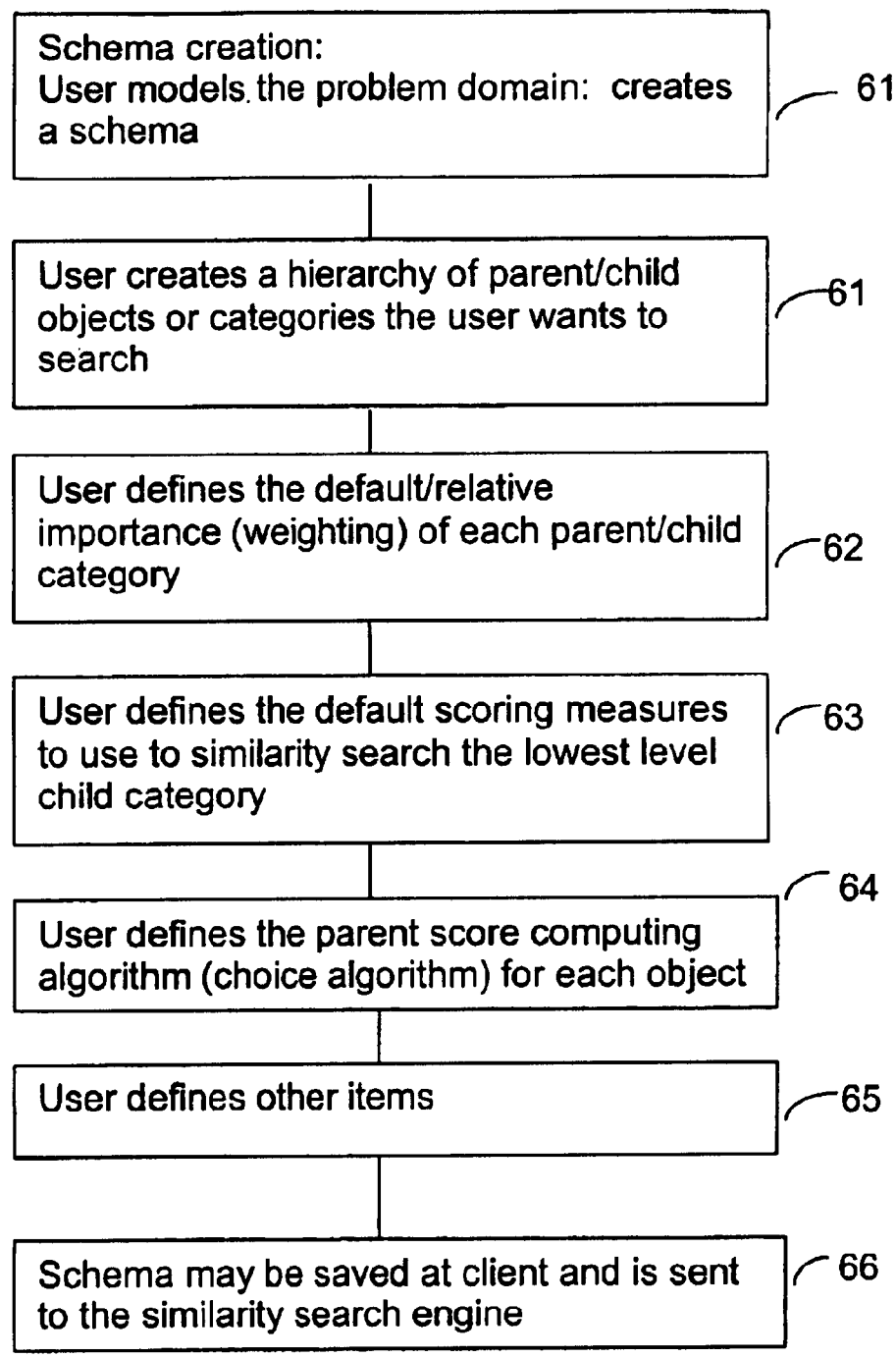
FIG. 10 shows a flowchart of the schema creation by user.

FIG. 10 shows a flowchart of the schema creation by user. The user models the problem domain and creates a schema 60. The user creates a hierarchy of categories in the form of parent/child objects or categories that the user is interested in searching 61. The user defines the default relative weighting of each parent/child object 62. The user defines the default scoring method (measure) to use to similarity search the lowest level child object 63. The user defines the parent score computing algorithm (choice algorithm) for each object 64. The user may also define other items of interest, including but not limited to, another database to cross-search, a maximum number of scores to return to control the length and corresponding time of the search, the type and content of the report of the results to the user 65. The problem domain model as represented in the schema may be saved at the client and is then sent to the SSE 66.

Figure 11:
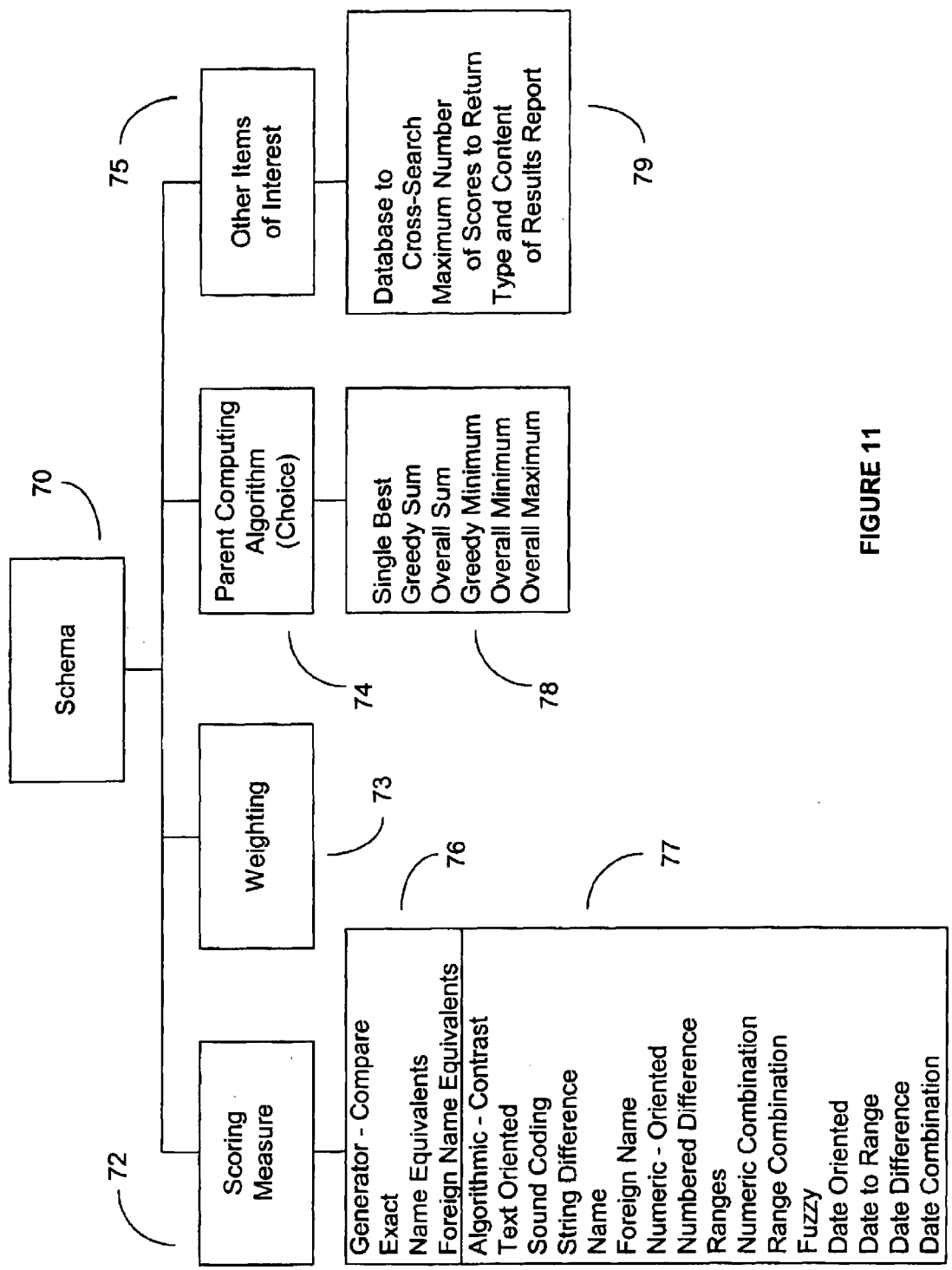
FIG. 11 is a block diagram of the problem domain as represented in the schema.

FIG. 11 is a block diagram of the problem domain as represented in the schema 70. The schema includes the scoring methods (called measures) 72, weighting within categories 73, and a parent score computing algorithm (called a score summing or choice algorithm) 74 along with other items specified by the user 75.

A scoring method (or measure) determines the type of similarity score to be given to the source data objects. The scoring method (or measure) type may be a generator 76 or algorithmic 77 in nature. A scoring method that is a generator 76 generates values for the search engine to use for comparison and then does a compare type of search on the data. Generator types may include exact, name equivalents and foreign name equivalents 76. The user may define other types of generators. An exact scoring method generates the exact value for the search engine to use in its comparison. A name equivalent scoring method generates an English language name along with similar names and nicknames. A foreign name equivalent scoring method generates a foreign name along with similar foreign names and nicknames. The name relationships may also be user defined. When the search engine does the search, the generated values are compared to the entries in the data band. A compare type of search looks only for similarity, doing so by performing a fast lookup in the data band. A match receives a preset score. Non-matching entries receive a default score, which is typically indicated by zero.

A scoring method that is algorithmic 77 in nature results in a contrast type search, which scores similarity and dissimilarity. Scoring methods that are algorithmic include text-oriented measures, numeric-oriented measures and date-oriented measures 66.

Text oriented measures include for example, sound coding, string difference (text based), name and foreign name, which are a combination of sound coding, string and name equivalents. The sound coding uses sound coding algorithms to search for words, particularly names. Examples of existing sound coding applications include Metaphone and Soundex. Sound coding algorithms are useful to search for words that sound the same in one language, such as English or for mixed language words. String difference searches for exact matches, missing characters, similar looking characters and reversed characters. An English name measure combines sound coding, string difference and name equivalents. A foreign name measure combines sound coding, string difference and foreign name equivalents.

Numeric oriented measures include numeric difference, ranges (range-to-point, range-to-range, range difference), numeric combinations, range combinations and fuzzy measures. A fuzzy measure assigns a score that varies depending on how close to or far away from a particular value is to a specific value sought.

Date-oriented measures include date-to-range, date difference and date combination.

The weighting among attributes 73 determines the relative weight to be given to each parent/child object in a search where there are multiple children within a parent object. For example, a parent category suspect may contain as child categories or attributes the suspect's height, weight and hair color. The user may want to give the child category height more importance (or weight) than suspect's weight and hair color. The user can specify the importance of the height category by given it an importance of, for example, 50% and may choose to give the suspect's weight and hair color an importance of 25% each respectively. The weighting will then be used to influence the combined score for suspect when the individual closeness scores for height, weight and hair color are combined to form one overall score for the suspect.

The scoring method 72 is used to score how similar or dissimilar each child category is for each document entry in the source database to be searched. The scoring is done on source data that has been organized into bands of data (called data bands) according to the categories to be searched. Scoring is the process of assigning a value to each entry in a data band according to the search criteria as delineated in the schema or query request from the user. The resulting score or number provides an indication of the closeness of the particular entry in a data band to the search criteria. The score is typically a number in a range of possible values, for example −1 to +1 or the like. Normally, the lowest number (in this example −1) indicates a minimum score, which may be considered very dissimilar. The maximum number usually indicates a very similar entry (in this example +1), while numbers in between represent varying degrees of similarity or dissimilarity. Other ranges of values are possible.

Figure 12A:
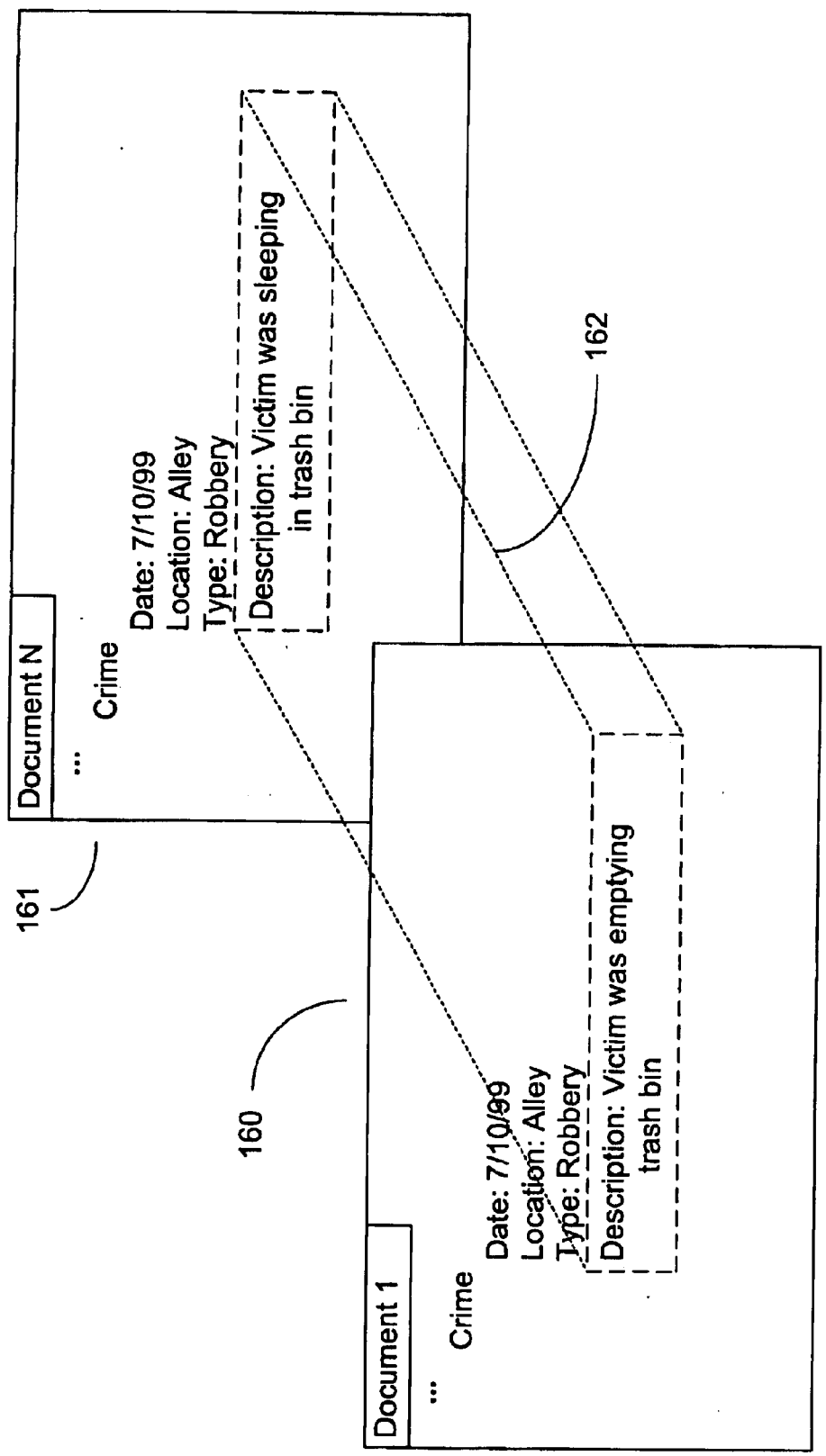
FIG. 12a is a conceptual view of a data band.

FIG. 12*a* is a conceptual view of a data band. A data band represents all items in a particular category that exist in the database or document to be searched. Documents 1 through n (160–161) are documents that are imported into the system for later searching. Each document 160–161 may contain a number of parent and child objects or categories. In this example, a parent category is Crime, which contains the child objects of Date, Location, Type and Description. The data band for description 162 contains all the documents that contain a description.

Figure 12B:
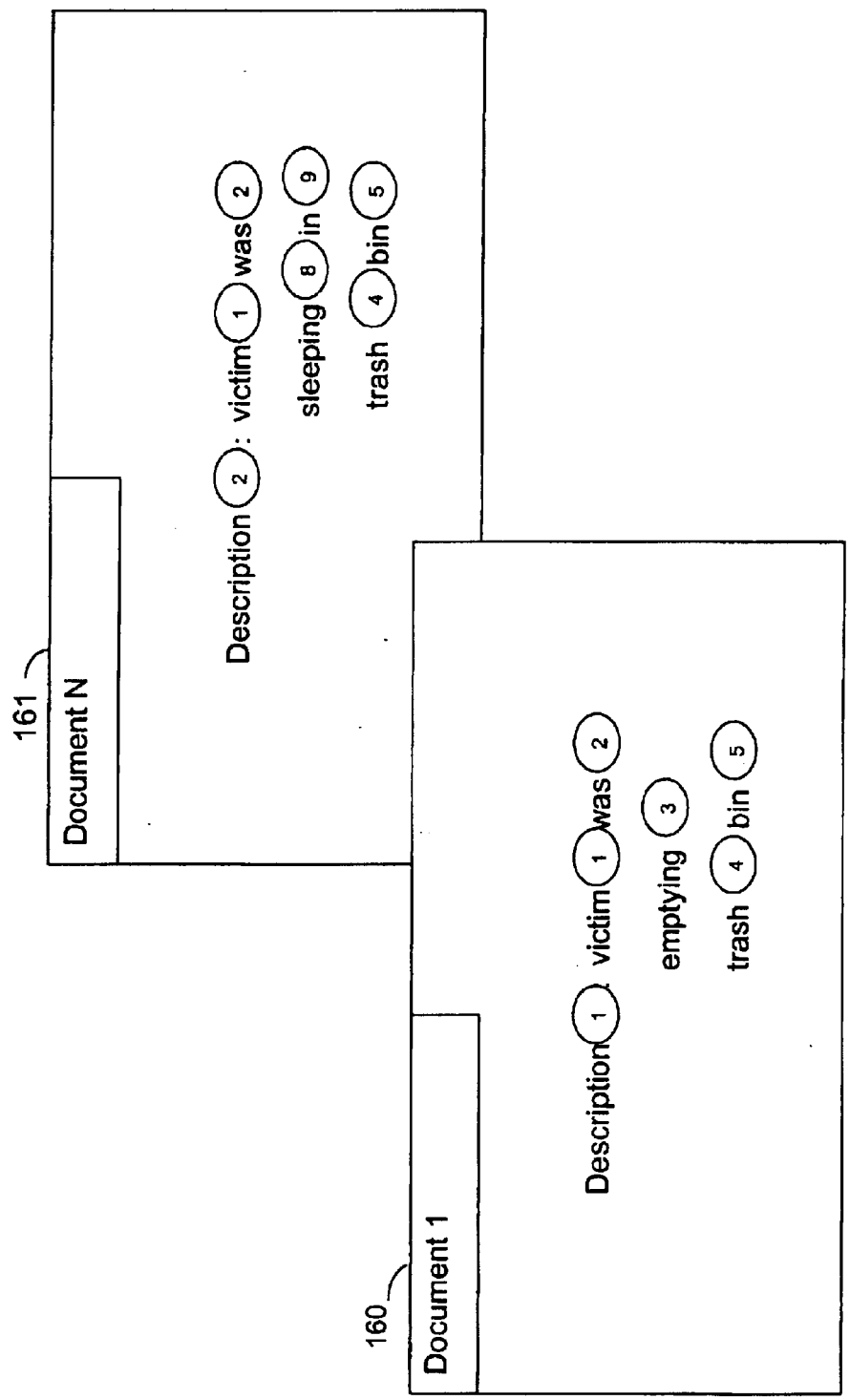
FIG. 12b shows the assignment of relative identifiers to parent and child categories in a set of documents.

FIG. 12*b* shows the assignment of the unique assigned identifiers (RIDs) to parent and child categories in a set of documents. This differs from previous systems in that each occurrence of a particular element or value of the description category within each document is not assigned a unique RID. Only unique elements or data items are assigned a unique RID. For example, as shown in FIG. 12*b*, victim occurs in both Document 1 (160) and Document N (161). In previous systems, victim in Document 1 would be given a unique RID and victim in Document N would also be given a unique RID. In the present system, victim would be given identified by RID 1 in both Document 1 (160) and Document N (161). Only unique data items are given unique RIDS. When the data bands are populated, the data may be tokenized, which means it may be partitioned into smaller pieces to be processed more efficiently. Various methods can be used to partition the data. Tokenizing algorithms can implement the partitioning methods. A type of tokenizing is shown here for the description category where the text is partitioned. In one implementation, the location of the data in the data band may be used as the RID.

Figure 12C:
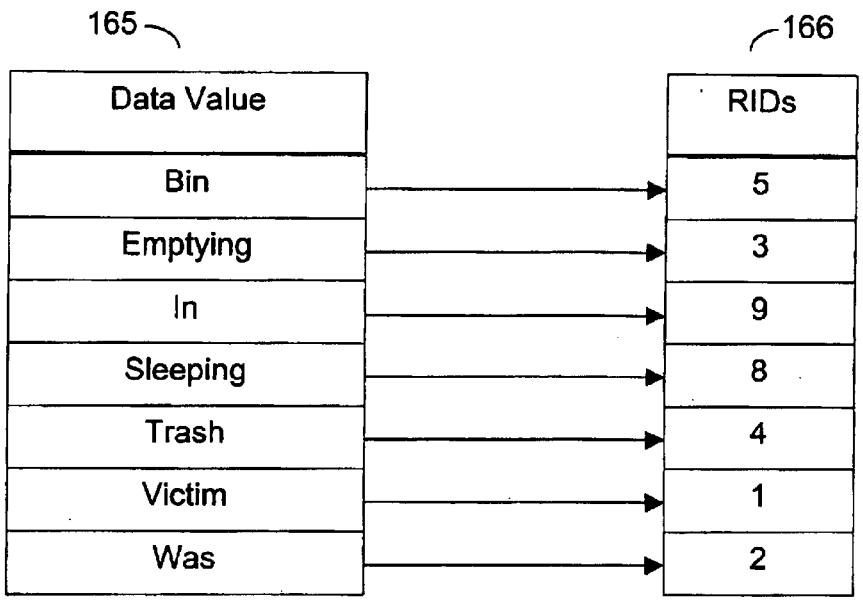
FIG. 12c shows the assignment of data items and RIDs.

Turning now to FIG. 12*c*, each unique data item 165 used within the particular context is stored only once and assigned a RID 166. The values 165 may be sorted, indexed or transformed in some other way, for example they may be case insensitive. The RIDS 166 may also be sorted to simplify lookup and increase locality.

Figure 12D:
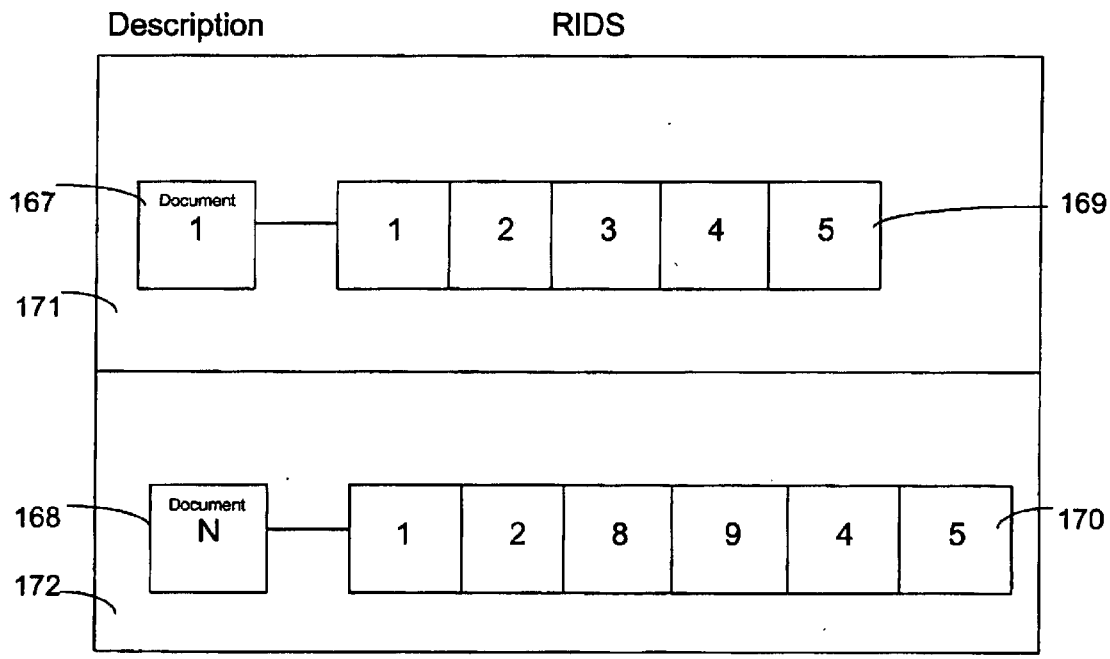
FIG. 12d shows an example of relation bands created using the RIDS from FIG. 12b.

FIG. 12*d* shows an example of relation bands 171–172 that are created using the RIDS from FIG. 12*b*. The relation band establishes connections between parent/child objects or categories. In this example, it ties particular word occurrences to the descriptions in which they appear. The score-summing algorithm then processes the relation bands. The Description from Document 1 (167) is represented by parent RID 1 and the description from Document N is represented by parent RID 2 (168). The RIDs 1 through 5 (169) are related to the Document Description 1 in which they are contained (167). The RIDs 1, 2, 8, 9, 4 and 5 are related to the Document Description N (168).

Figure 12E:
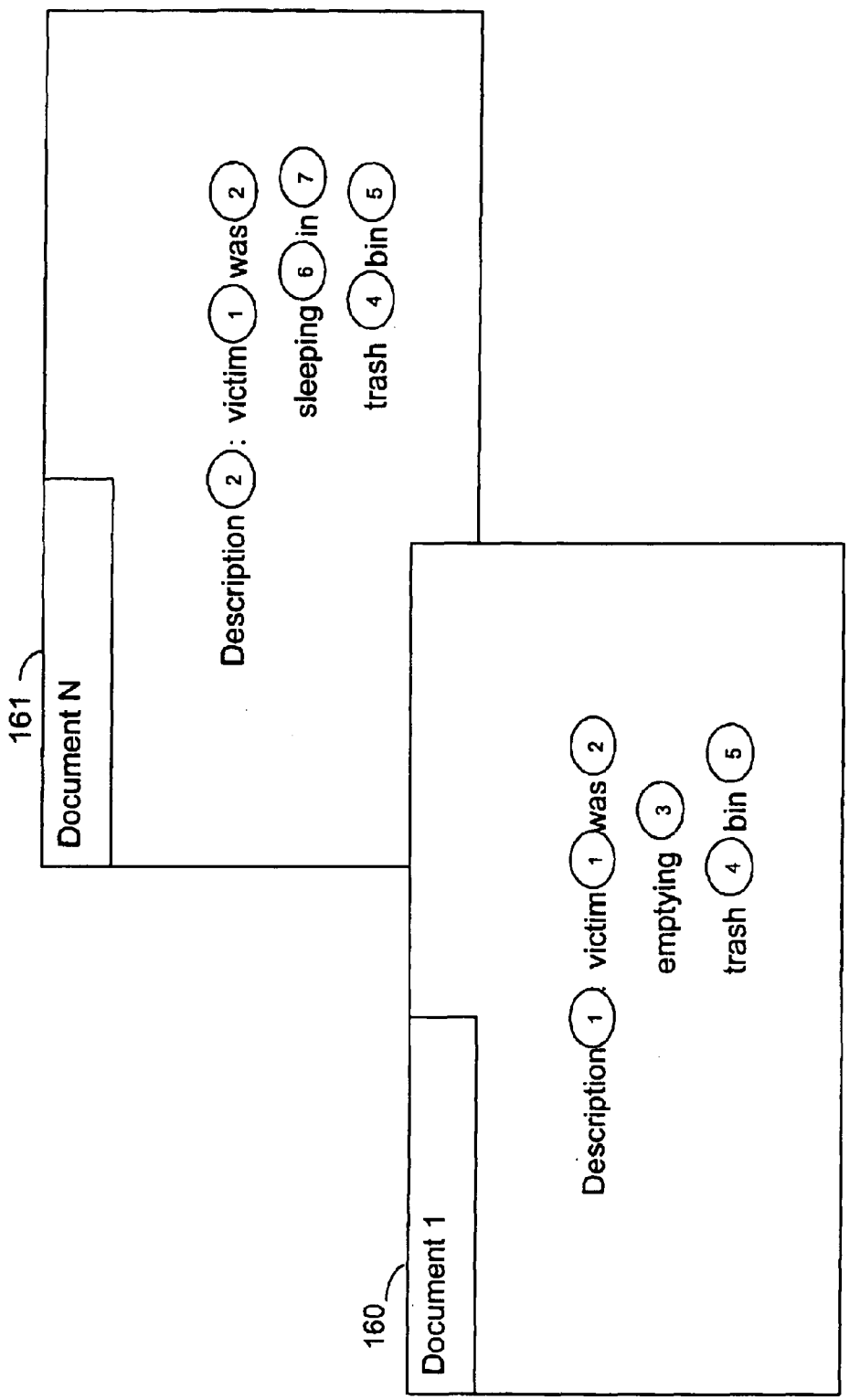
FIG. 12e is an alternate embodiment of conceptual view of a data band.
Figure 12F:
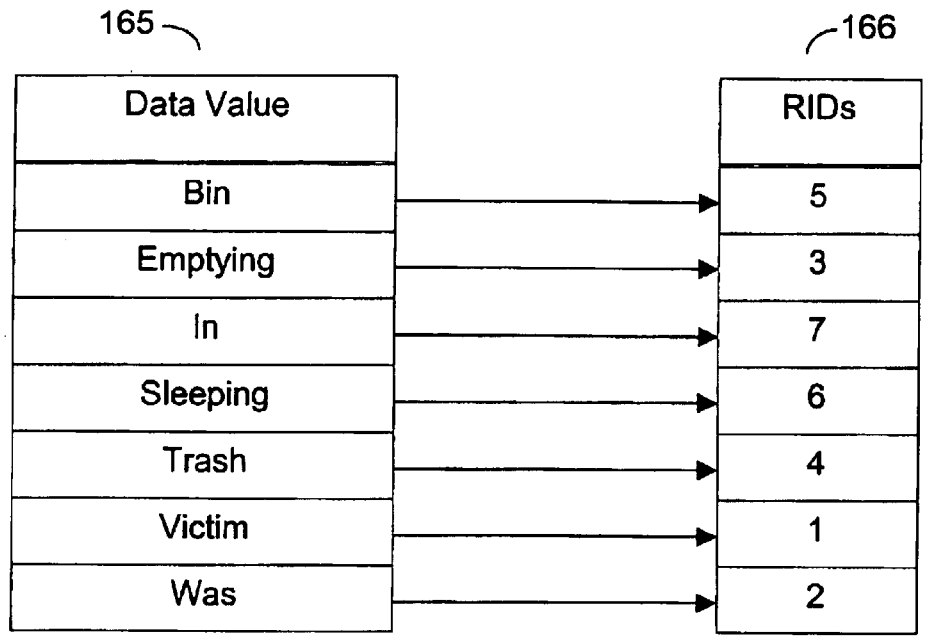
FIG. 12f shows the assignment of data items and RIDs in accordance with the embodiment of FIG. 12e.
Figure 12G:
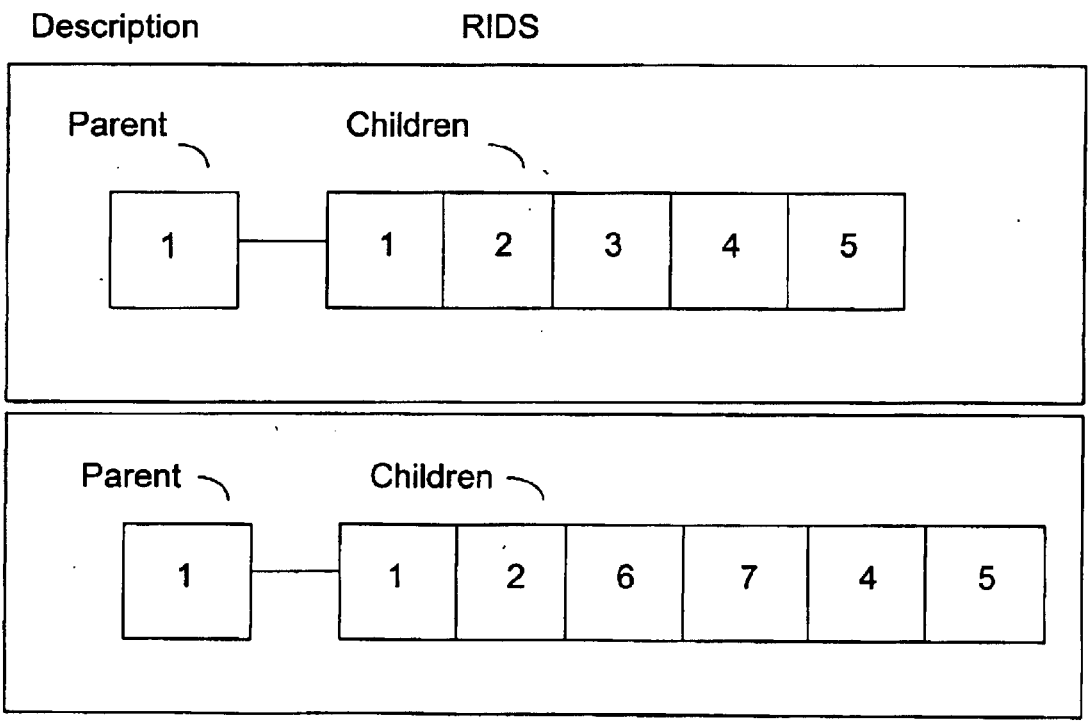
FIG. 12g shows the assignment of data items and RIDs in accordance with the embodiment of FIG. 12e.

FIG. 12*e* shows an alternate embodiment of the assignment of the unique assigned identifiers (RIDs) to parent and child objects in a set of documents. In this case the RIDs assigned are contiguous as an optimization because the RIDs can then act as an indices to the data items. FIG. 12*f* is similar to FIG. 12*c*, but shows the RIDs assigned to the data items FIG. 12*e*. Since they are assigned contiguously, the RIDS can act as an indices to the data items. FIG. 12*f* shows the relation bands that are created using the RIDs from FIG. 12*f*.

Turning back to FIG. 11, the parent score computing algorithm (choice or score summing algorithm) 74 is used for determining which score results will be selected for a particular category. In the scoring function discussed above, all entries within a data band established for that category are assigned a score of how similar or dissimilar the data is to the search criteria. All data bands that have more than one entry to search will then result in multiple scores. The parent score computing algorithm 74 then takes the score selected for each category and combines the scores (using the parent score computing algorithm and weighting selected by the user or the default weighting) into each parent category to arrive at an overall score for the highest level parent category. This process of selecting the score results and combining the results for the child categories into their parent categories is sometimes called rolling up the scores or a rollup. The parent score computing algorithm 74 determines the selection and combination of multiple scores when more than one score is available within a particular category for multiple entries of the same category within same document. The parent score computing algorithm may include single best, greedy sum, overall sum, greedy minimum, overall minimum and overall maximum 78 algorithms. Other types of algorithms for combining the scores may also be used.

The other items of interest 75 include but are not limited to specifying another database to cross search, the maximum number of scores to return for an object or category and the types and content of the results reported to the user 79.

Figure 13:
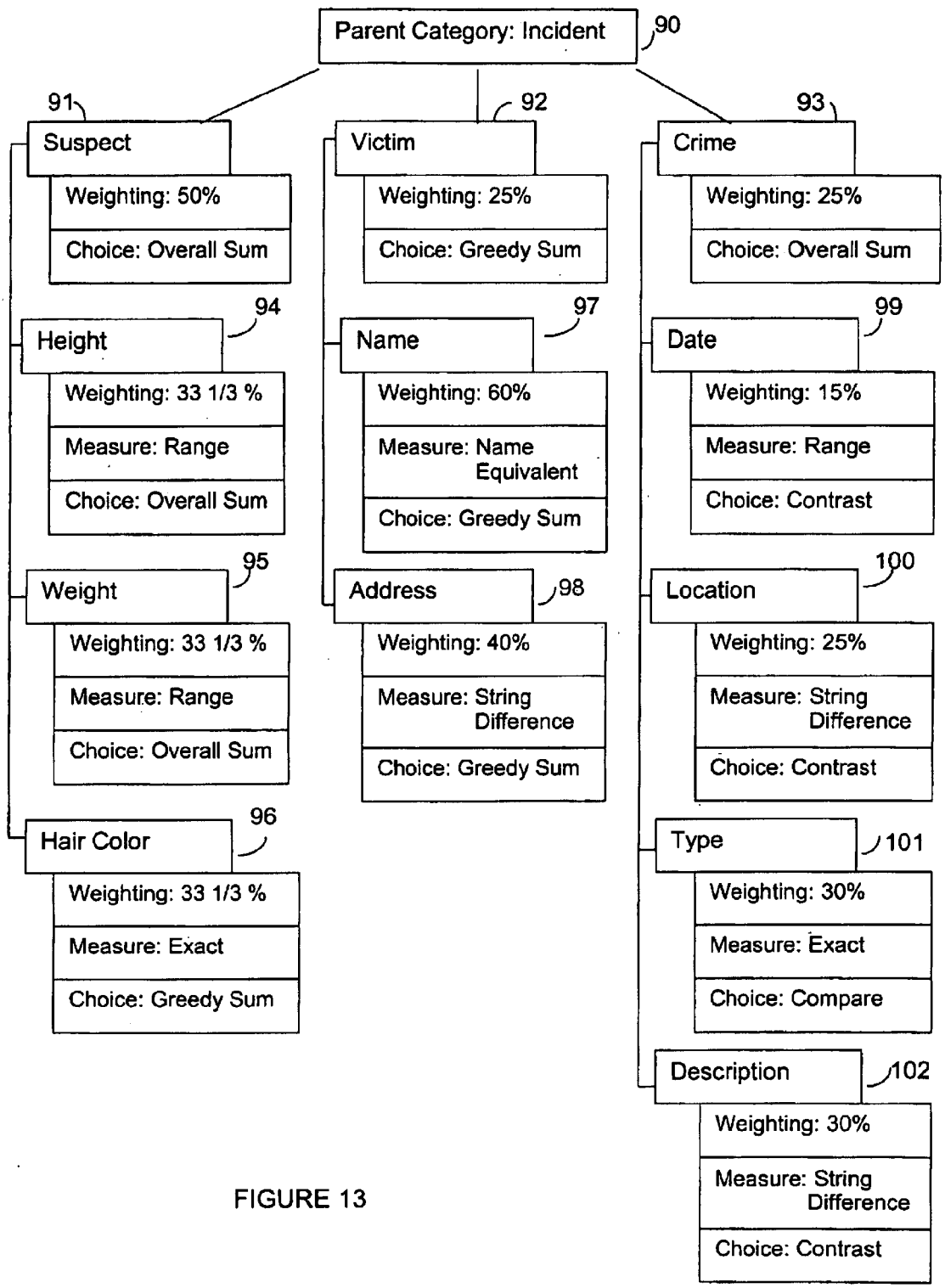
FIG. 13 is an example of the schema generation process

FIG. 13 is an example of the schema generation process in which the user models the problem domain. In this example, the parent category is called an incident 90. The parent object category incident 90 has three child objects or categories: suspect 91, victim 92, and crime 93. The user specifies the importance or weighting to be given to the child categories 91–93. In this case, suspect 91 is given weighting of 50%, victim 92 is given weighting of 25% and crime is given weighting of 25%. This means that finding a match for suspect 91 is more important when scoring similarities/contrasts within the suspect, victim and crime level one category. A parent score computing algorithm is also specified for each child category. The parent category of suspect 91 contains three child objects or categories height 94, weight 95 and hair color 96. The parent category of victim 92 contains two object categories name 97 and address 98. The parent category of crime 93 contains four object categories date 99, location 100, type 101 and description 102. Each child category 94–102 contains user-specified weighting, a scoring method (called a measure) and a parent score computing algorithm.

Figure 14:
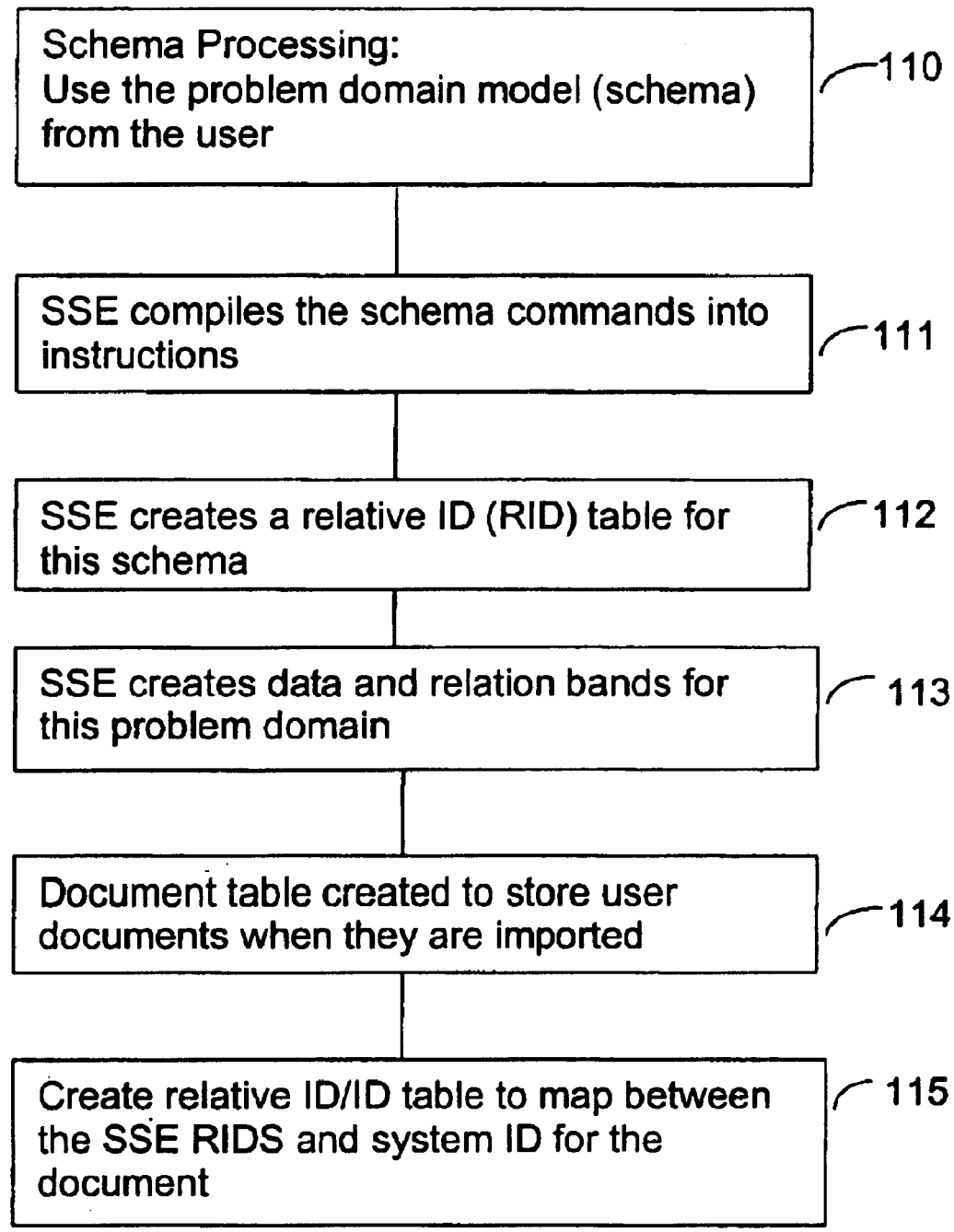
FIG. 14 is a flowchart of the schema processing.

FIG. 14 is a flowchart of the schema processing. The user generated problem domain model, as represented by the schema, is sent to the SSE server 110. This can occur through a gateway as shown in FIG. 7 or may be sent directly from the client in a non-networked configuration as shown in FIG. 8. In the stand-alone configuration as shown in FIG. 6, the schema function may reside in the same workstation/computer as the SSE function. The SSE compiles the commands into instructions using the SSE compiler 111 (51, FIG. 9). The SSE creates a unique assigned identifier (RID) table for the problem domain as represented by the schema 112. The SSE creates indexing (data and relational bands) for the problem domain 113. A document table is created to store user documents 114. A unique assigned identifier(RID)/identifier table to map between the SSE RIDs is created, which will be assigned to each document and the system identifiers 115, where the system identifier is a primary document key used by the user and the system (other than the SSE) to identify documents to be searched 115.

Figure 15A:
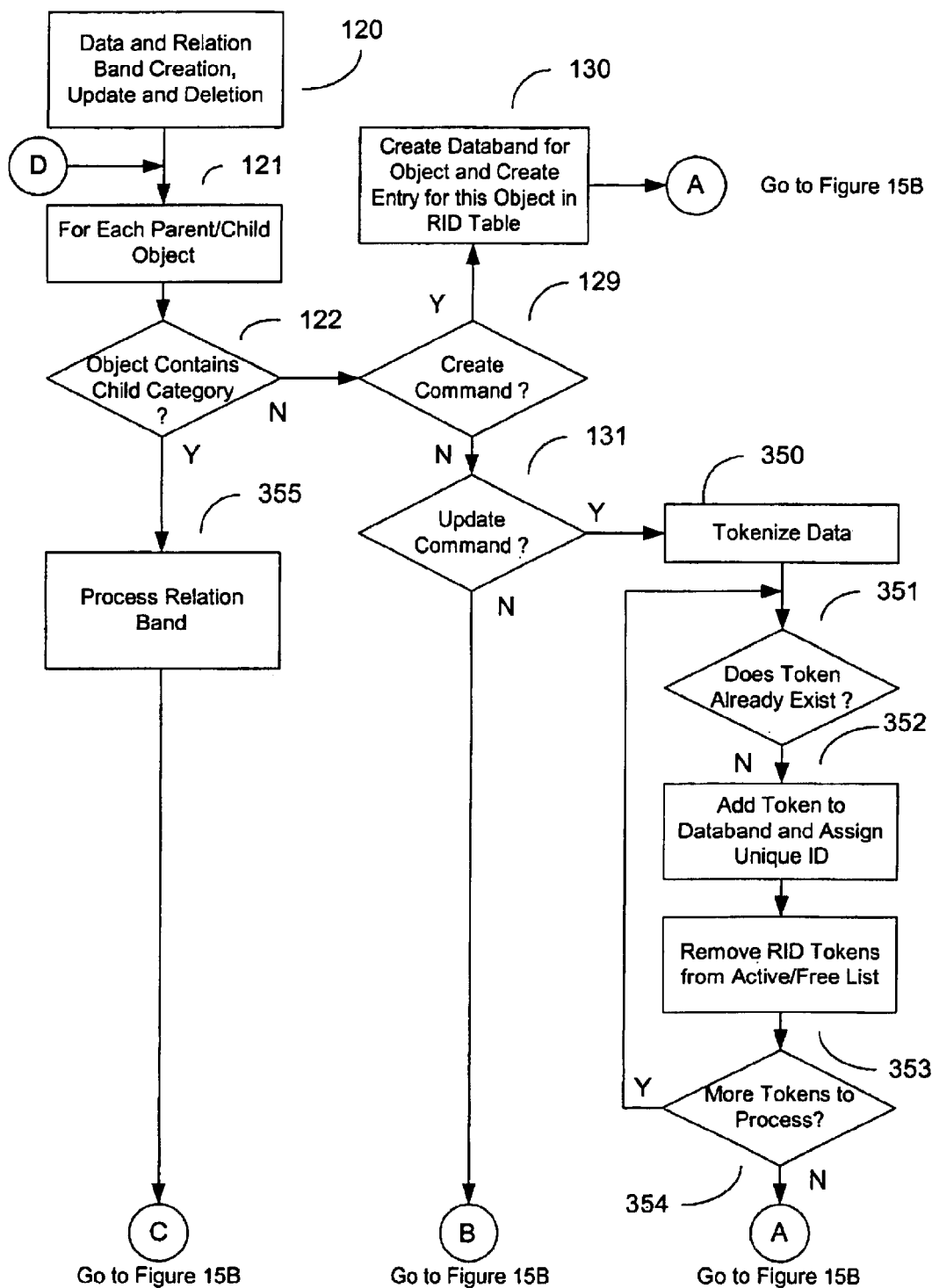
FIGS. 15a and b are flowcharts of the data and relation band creation, update and deletion process.
Figure 15B:
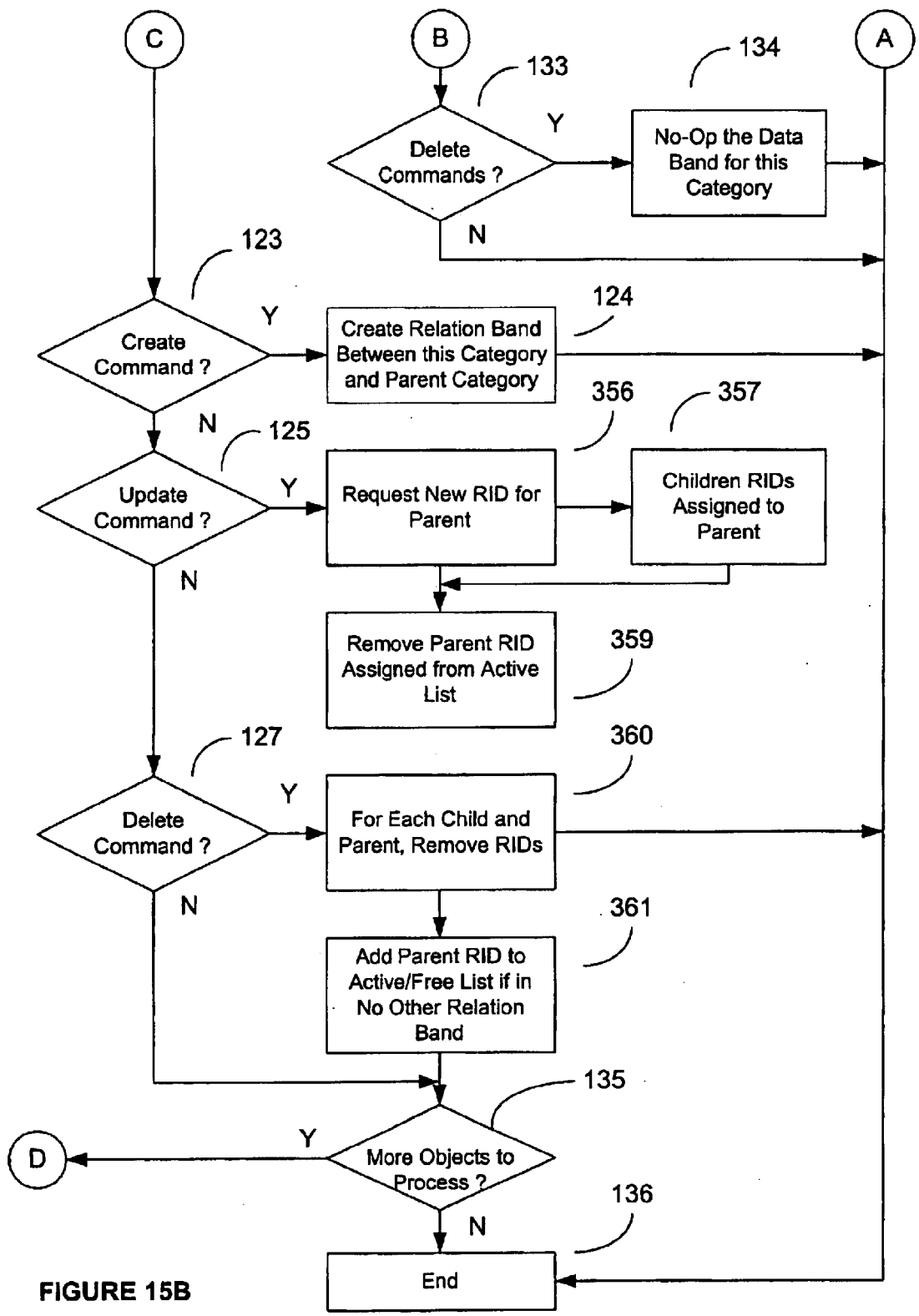

FIGS. 15a and 15B are flowcharts of the data and relation band creation, update and deletion process 120. For each parent/child object 121, if the current category contains one or more child categories 122 and the schema's relation band command type is create 123 (indicating that a new relation band is to be created), the relation band between this category and its parent is created 124. If the schema's relation band command type is update 125, a new RID is requested for the parent object. The children object's RIDs are assigned to the parent 357. The parent RID that was assigned is removed from the active RID list 359. If the schema's relation band command type is delete 127, for each child and parent, the RIDS are removed 360. If the parent RID does not occur in another relation, the parent RID is added to the active or free RID list 361. The relation band between this category and the parent category is deleted 364 and processing continues step 135.

If the current category does not contain a child object 122 (meaning that the category is at the lowest possible level), then data bands are created. If the schema's command type is create 129, a data band is created 130. If the schema's command type is update 131, an existing data band is updated. The data is tokenized 350. If the token already exists 351, processing continues at step 354. If the token does not already exist 351, the token is added to the data band and assigned a unique ID 353. The unique RID assigned is removed from the active/free list of RIDs 353. If there are more tokens to process 354, processing continues at step 351. If the schema's command type is delete 133, the data band for this category is no oped (no operation) 134. If there are more objects to process 135, then processing continues at step 121. Otherwise, processing ends 136.

Figure 16:
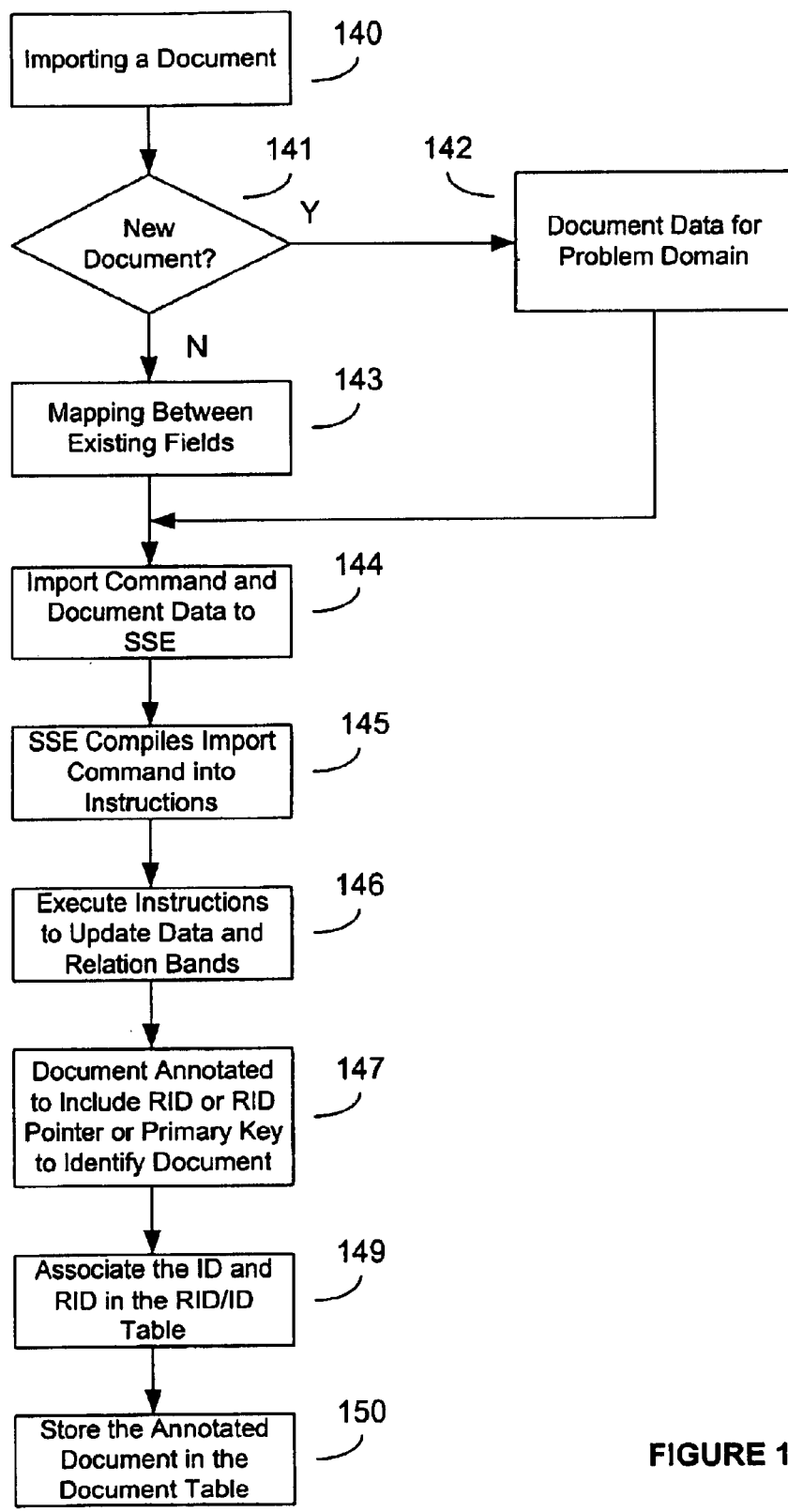
FIG. 16 is a flowchart of importing a document.

FIG. 16 is a flowchart of importing a document 140. After the data and relation bands have been created (as shown in FIG. 15) as part of the processing of the schema, the user may then import the documents to be searched using the schema. Alternatively, the user may create the document on-line 141 via a user-interface. An interactive mode with the user allows the user to enter document data for the problem domain as specified in the query 142. If an existing document, normally stored in a database is to be search, the user maps between the files of the preexisting document stored in a relational or object oriented database and the problem domain hierarchy previously modeled by the user 143 (as shown in FIGS. 10 and 14). In either case, the import command and document data are sent to the SSE server 144. The SSE query request compiler (51, FIG. 9) compiles the import command into instructions 145. Instructions are executed to update the data bands and relation bands 146. The SSE virtual machine (52, FIG. 9) executes the compiled import command instructions which populates the data bands and relation bands that were created during the schema processing (shown in FIG. 10). The imported document itself is annotated to include the RID or RID pointer its components have been assigned or the primary key is used to identify the document 147. The document ID and RID are associated in the RID/ID table 149 (42, FIG. 8) which may be located in the FSS or in the SSE. The annotated document is stored in the document table 150 (41, FIG. 8).

Figure 17:
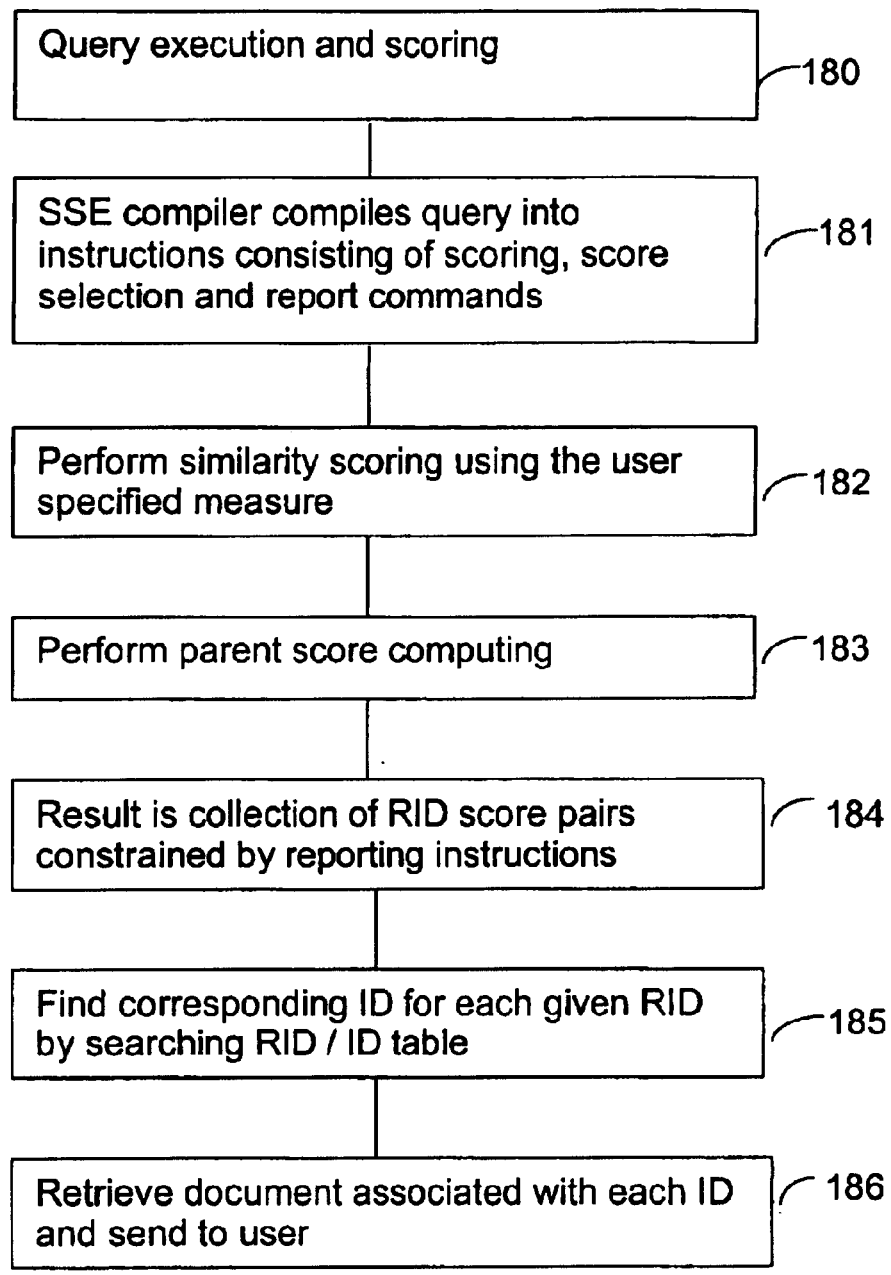
FIG. 17 is a flowchart of the query execution and scoring.

FIG. 17 is a flowchart of the query execution and scoring 180. A query is entered by the user and represents the actual search criteria. The SSE compiler 181 (51, FIG. 9) compiles the query into instructions where the instructions consist of scoring, parent score computing algorithm (score summing) and report commands 181. The SSE execution and scoring function (52, FIG. 9) performs similarity scoring 182 and computes the parent score 183 resulting in collections of RID score pairs constrained by reporting instructions 184. The corresponding ID for each given RID is found by searching the RID/ID table 185. The document associated with each ID is retrieved and sent to the user 186.

Figure 18:
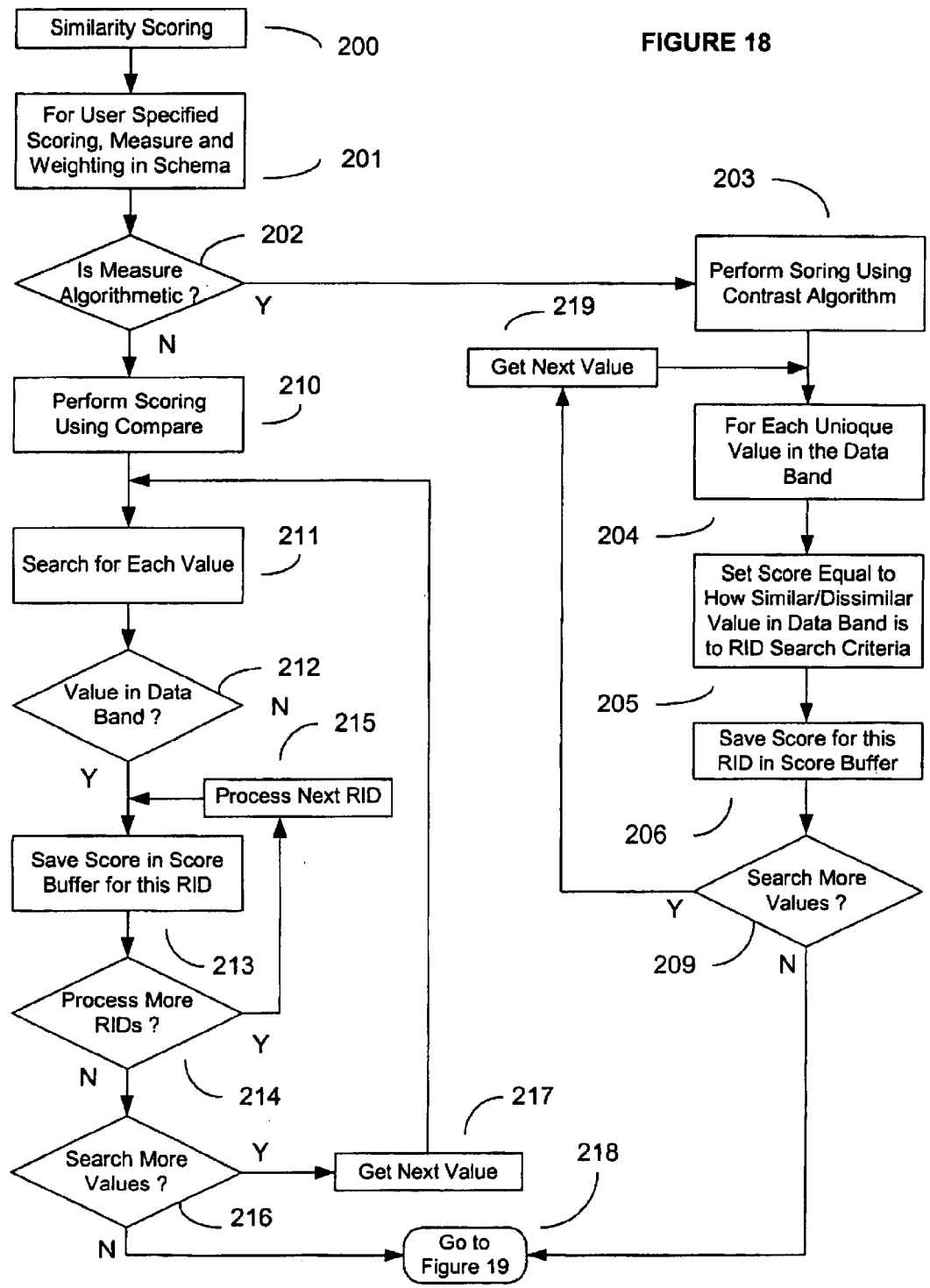
FIG. 18 is a flowchart of the similarity scoring process.

FIG. 18 is a flowchart of the similarity scoring process 200. For a user specific scoring method and weighting in the schema 201, if the scoring method is algorithmic 202, scoring is to be performed using a contrast algorithm 203. For each unique value in the search criteria to be searched 204, the score is set to how similar or dissimilar the value for this entry (indicated by an RID) within the data band is to the search criteria 205. The resulting score for this RID is saved in a score buffer for this RID 206. Because there is only one score for each unique RID, there is no need to check for more RIDs for the same value which increases processing speed. If there are more unique values in the data band to search 209, the next value is fetched 219 and processing repeats steps 204 through 206 until there are no more values to search 209, processing continues in FIG. 19.

In FIG. 18, if the scoring method not algorithmic, and is instead a generator type scoring method 202, scoring is performed using a compare type search 210. For each value to search 211, if the value exists in the data band, a preselected score is saved in the score buffer for this RID 213. If there are more entries in the data band (RIDs) to process 214, the next entry (RID) in the data band is processed 215 and steps 213 and 214 are repeated. If there are no more entries in the data band (RIDs) to process 214 and there are more values to search 216, the next value to search for is obtained 217, and steps 211 through 216 are repeated. If there are no more values to search 216, processing continues in FIG. 19.

Figure 19:
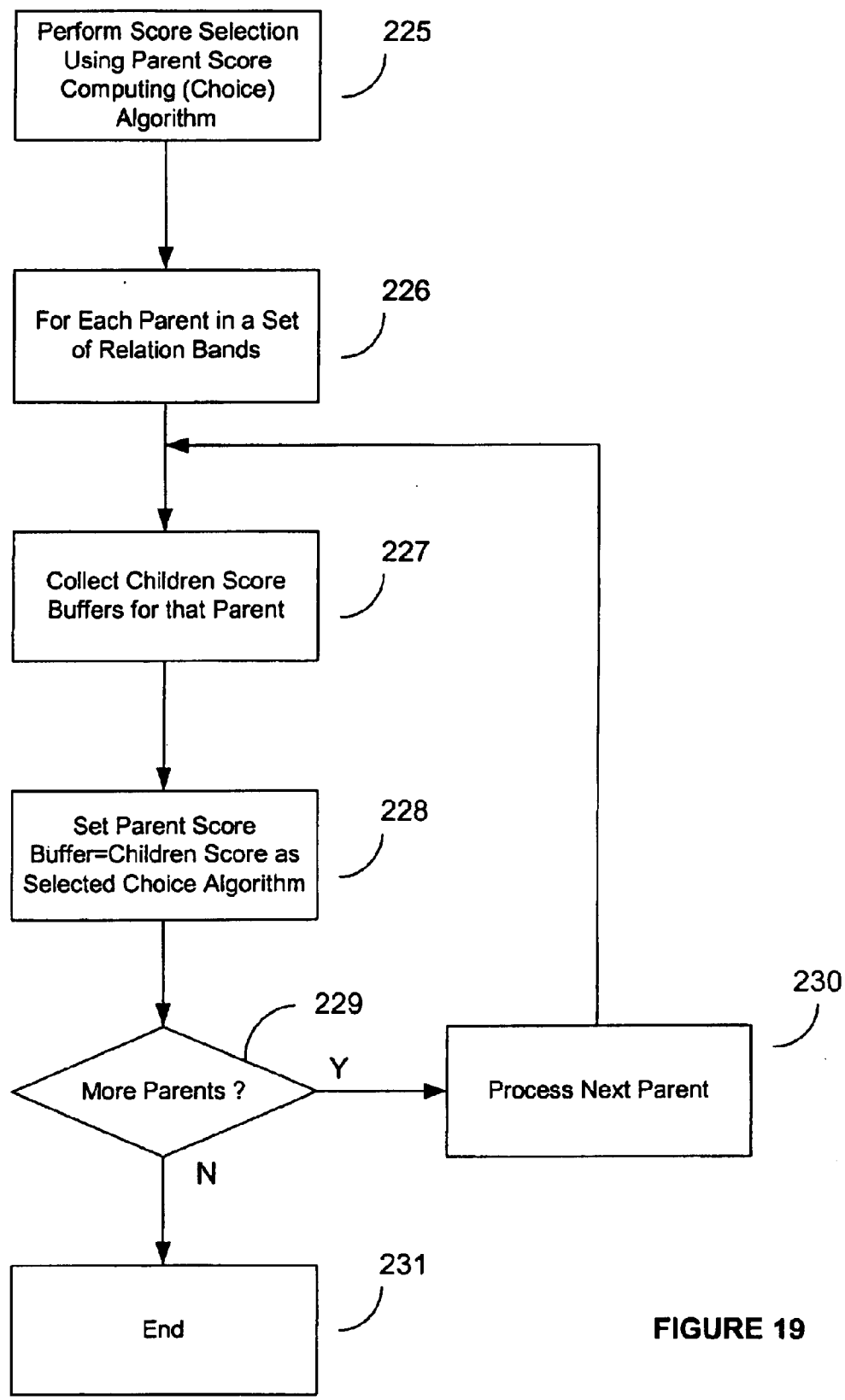
FIG. 19 is a flowchart of the process of score selection using the parent score computing algorithm.

FIG. 19 is a flowchart of the process of score selection using the parent score computing algorithm 225. For each parent in a set of relation bands 226, the children score buffers for that parent are collected together 227. The collection may be represented by a matrix. However, a physical matrix need not be used but may be logically constructed using the RIDs. The parent score buffer at a particular parent RID is computed from the children's score buffers as computed by the parent score computing algorithm 228 (choice algorithm or score summing algorithm). FIG. 20 is a table listing six parent score computing algorithms and their respective processing. Other types of parent score computing algorithms may be used in step 228. If this is the highest level category, that is there are no more parent categories above 229, then processing ends 231. If there are more parents 229, that is, this parent category is a child category, then the next parent category is processed 230 and steps 227 through 229 are repeated.

FIG. 20 is a table of parent score computing algorithms that may be used in the score selection process. For all algorithms, it is assumed there are N number of children scores to process. In the single best algorithm 240, the parent score is set to the single largest score selected from the children score buffer. In the greedy sum algorithm 241 with a children's score buffer containing N number of scores, the largest score in the children score buffer is selected first, followed by the second largest until the Nth largest. The parent score is set to the sum of the results. In the overall sum algorithm 242, children scores are selected such that the sum of all scores is maximized. In the greedy minimum algorithm 243, the smallest score is selected first, followed by the next smallest until the N smallest is reached and the results are then summed. In the overall minimum algorithm 244, children scores are selected such that the sum of all scores is a minimum value. In the overall maximum algorithm 245, children scores are selected such that the sum of all scores is maximized and only the top score form this set is returned.

Figures 21B, 21C:
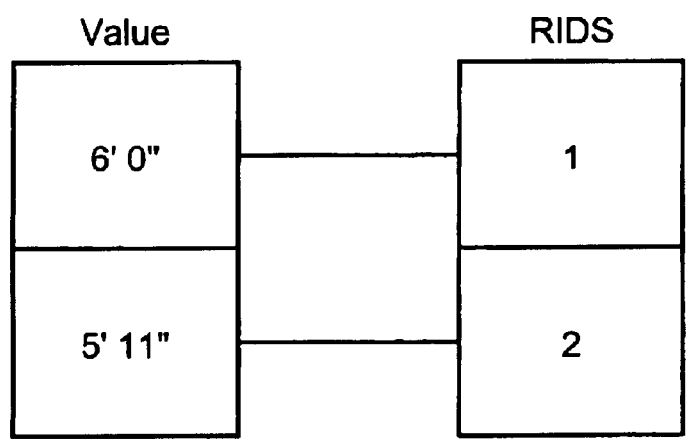

FIG. 21a shows an example of a database containing three incidents. The database example follows the schema specified in FIG. 13. The overall parent category/object is Incident, which contains the child/object categories of Suspect, Victim and Crime. The Suspect category contains the child/object categories of height, weight and hair color. Victim contains child/object categories name and address. Crime contains child/object categories date, location, type and description. FIG. 21b is an example of search criteria from a schema initiated by user. For simplicity in this example, the schema indicates a search is to be done for one suspect with height, weight and hair color as specified in FIG. 21b. The schema could contain multiple search criteria; in addition to suspect, the schema could also contain a crime description associated with the suspect. Using the schema search criteria and working from the lowest child/object level, a separate data band is created for weight, height and hair color. A separate relation band is created for Incident/Suspect/Weight, Incident/Suspect/Height and Incident/Suspect/Hair Color. Another relation band is created for Incident/Suspect, Incident/Suspect and Incident/Suspect.

Turning back to FIG. 21a, the search criteria of FIG. 21a and the data and relation bands created as discussed above are used to assign unique assigned identifiers (RIDs) to the entries in the database shown in FIG. 21a. Each Incident in the database is assigned a RID. A RID is dependent on a specific context and identifies only a particular item within that context. The actual RID number given to each entry in the database is arbitrary and any type of identification scheme such as a combination of numbers and letters may be used so long as the RID uniquely identifies the item within its context. In this example, the RIDs are unique identifiers with the contexts of Incident/Suspect/Height, Incident/Suspect/Weight and Incident/Suspect/Hair Color. For the purposes of this example, there are three incidents assigned RIDs 1 through 3. Each incident has a suspect, victim and crime. There are three suspects, assigned RIDs 1 through 3. RIDs would also be assigned to identify the victim and crime categories, but for the purposes of this example, we will discuss the suspect category only. RID 1 identifies height, weight and hair color within the data band for suspect 1. Height, weight and hair color within the data band for suspect 2, are identified by RID 2. Heights, weight hair color within the data band for suspect 3 are identified by RIDs 2 and 3. Unique RIDs are assigned to the unique data items only. For example, height of 6'0" is assigned RID 1 for Suspect 1. Height 5'11" is assigned RID 2, for Suspects 2 and 3. If the data items in the Name category is run through a tokenizer, for example, John is assigned RID 1 for both Suspects 1 and 3. The assignment of the actual RID is arbitrary. For example, it is possible that each attribute for suspect 1 could have different RID numbers, not just RID 1. The RID assigned could even be the location of the data in the data band.

Figure 21D:
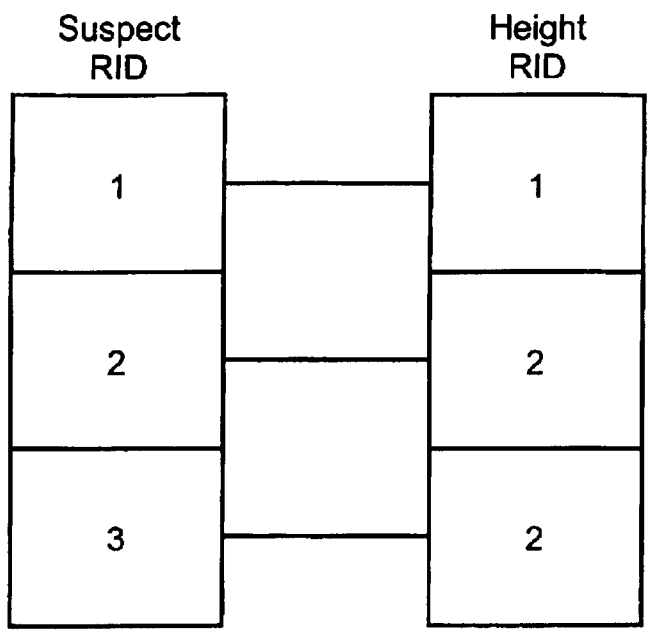
FIG. 21d shows the relation bands created for Suspect/Height.
Figure 21E:
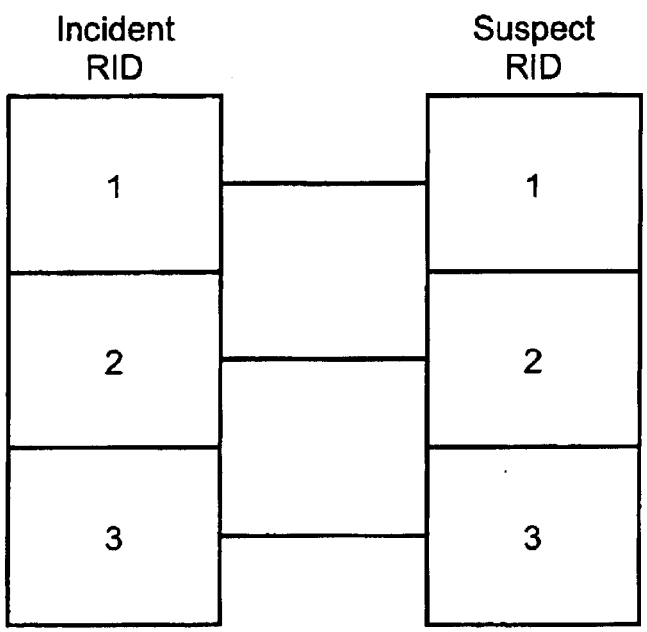
FIG. 21e shows the relation bands for Incident/Suspect.

FIG. 21c shows the data bands created for Incident/Suspect/Height for the database entries of FIG. 21a. The height value of 6'0" is represented by RID 1. The height value of 5'11", which is the height of Suspect 2 and 3 is represented by RID 2. FIG. 21d shows the relation bands created for Suspect/Height. Each Height RID of FIG. 21c must be related to its parent category Suspect. RID 1 which represents the height value 6'0 is associated with Suspect 1, RID 2, which represents the height value 5'11" is associated with Suspects 2 and 3. The Suspect category must be related to its parent category Incident. This is shown in FIG. 21e. Incident RID 1 is associated with Suspect RID 1, Incident RID 2 is associated with Suspect RID 2 and Incident RID 3 is associated with Suspect RID 3.

FIG. 21f shows the commands for scoring methods and parent object scorings input by the user into the schema. For height and weight, the schema specifies a numeric oriented measure which results in a contrast type search (similarities and dissimilarities are searched) within the range specified by the user. For hair color, the schema specifies an exact match, which results in a compare type search. A score will be determined for each value in the data band (FIG. 21c) based on the search criteria. The scores for each category must be saved in a score buffer and the score buffer are designated 1 through 3.

FIG. 21g shows the resulting scoring for the score buffers. Score buffers 1 through 3 correspond to the height, weight and hair color scores. Score buffer 1, RID 1 is given a score of 0.75 (75% match) because it is within the range of the search criteria of 5'11', but is not an exact match. Score buffer 1, RID 2 is given a score of 1.0 (100% match) because it exactly matches the search criteria. Similar results are shown for score buffers 2 and 3.

Turning now to FIG. 21h the commands for summing scores are shown. Score summing uses the parent score computing algorithm specified by the user in the schema. The parent score computing algorithm takes the score determined for each category and combines or rolls up these scores into each parent category to arrive at an overall score for the highest level parent category. The weighting given to each category of height, weight and suspect is specified as equal, but any type of weighting is possible and can be specified by the user in the creation of the schema. The results in score buffer 1, which contains the height scores are first summed using the overall sum algorithm and the result for Suspect/Height is saved in score buffer 4 RID 1 (FIG. 21*g*). The results in score buffer 2, which contains the weight scores are first summed using the overall sum algorithm and the result for Incident/Suspect/Weight is saved in score buffer 4 RID 2 (FIG. 21*g*). The results in score buffer 3, which contains the hair color scores are summed using the greedy sum algorithm and the results for Suspect/Hair Color is saved in score buffer 4 RID 3 (FIG. 21*g*). The results of all three score buffers must now be combined into parent category of Incident/Suspect. In this case, since each incident contains one suspect, score buffer 5 which holds the results for the Suspect for RIDs 1 through 3 has the same values as score buffer 4. The results in FIG. 21*g* indicate that Incident1/Suspect1 (FIG. 21*a*) is probably the most similar to the search criteria based on the measure and parent score computing algorithm in the schema, while Incident2/Suspect 2 is next similar followed by Incident3/Suspect3.

Figures 21I, 21J:
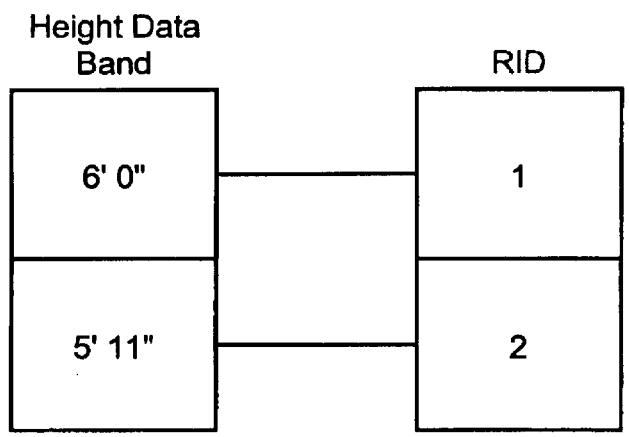
FIG. 21i contains additional database entries.
FIG. 21j shows the data bands created for Incident/Suspect/Height for the combined database of FIG. 21a and FIG. 21i.
Figure 21K:
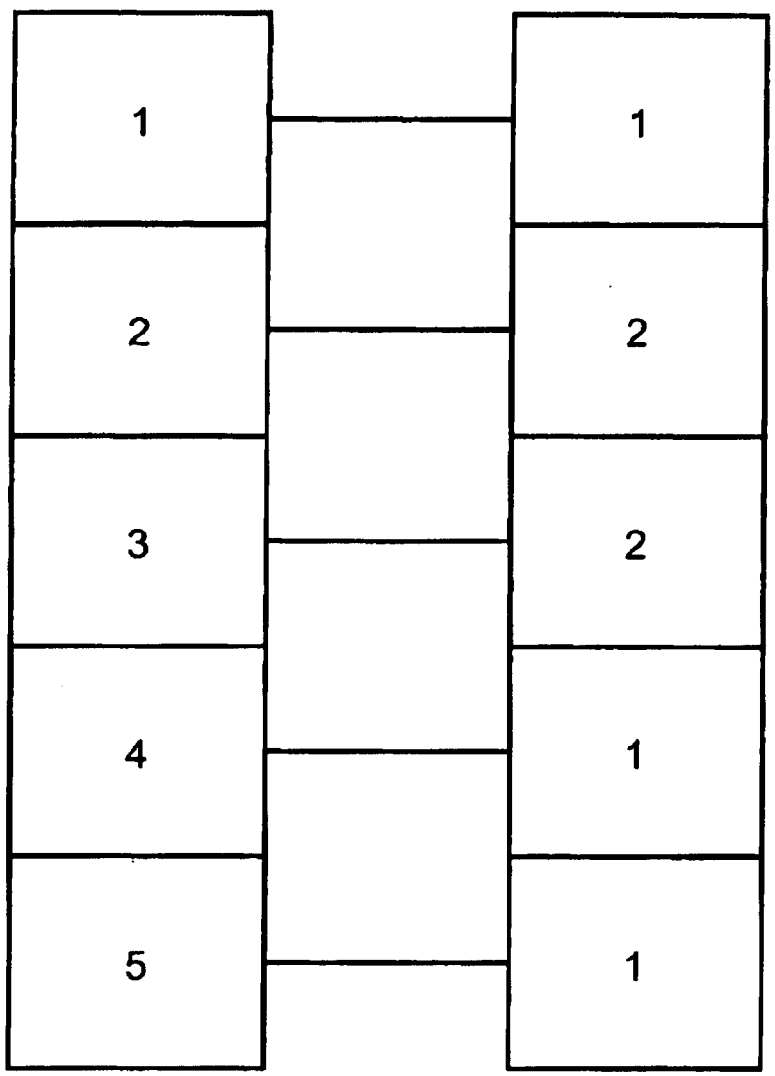
FIG. 21k shows the relation bands for Incident/Suspect/Height for the combined database of FIG. 21a and FIG. 21i.
Figure 21L:
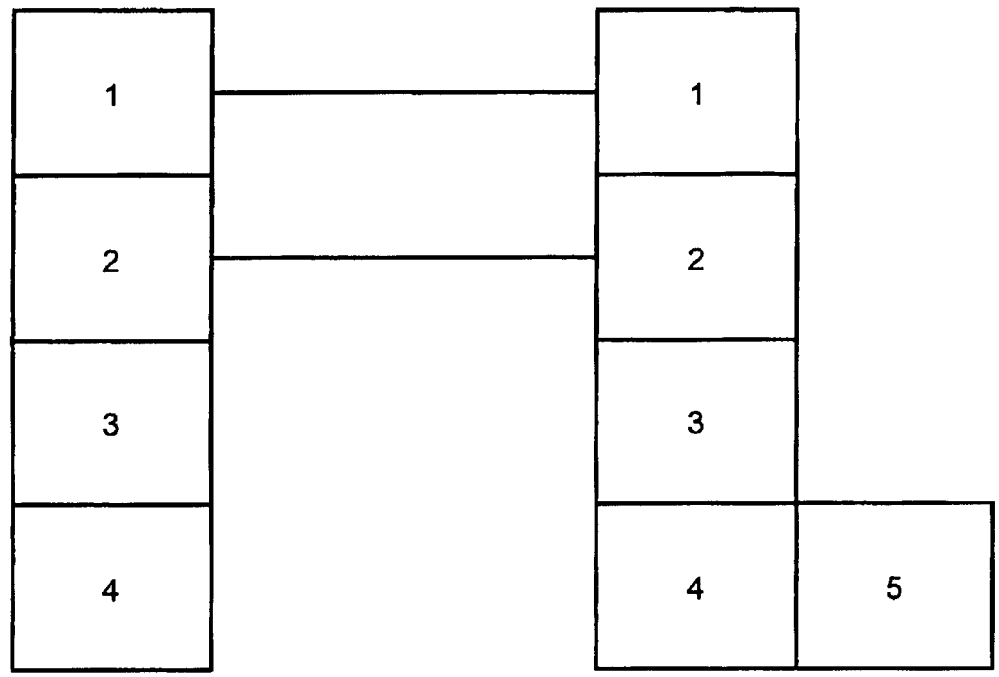
FIG. 21l shows the relation band for Incident/Suspect for the combined database of FIG. 21a and FIG. 21i.

FIG. 21*i* contains additional database entries to be added to the database of FIG. 21*a*. In FIG. 21*i*, one Incident (Incident RID4) having two Suspects (Incident RID4 and RID5) are added. It should be noted that for the data items that are already in the data band (such as height of 6'0" and weights of 200 and 210) and have been assigned RIDs, those previously assigned RIDs are used. For data items in the additional database entries that are unique, new RIDs are assigned (in this case hair color of red is assigned RID 4. FIG. 21*j* shows the data bands created for Incident/Suspect/ Height for the combined database of FIG. 21*a* and FIG. 21*i*. FIG. 21*k* shows the relation bands for Incident/Suspect/ Height for the combined database of FIG. 21*a* and FIG. 21*i*. FIG. 21*l* shows the relation band for Incident/Suspect for the combined database of FIG. 21*a* and FIG. 21*i*. Incident 4 has two suspects, categories 4 and 5. FIG. 21*m* shows the resulting score buffer 4 (similar to FIG. 21*g*) with the additions of scores for RID 4 and RID 5. In this case, since incident 4 contains two suspects RID 4 and RID 5 (FIG. 21*i*), a choice must be made between Incident 4, Suspects 4 and 5. Since the parent score computing algorithm being used for score buffer 5 is single best, RID 5 in score buffer 4 is chosen because it is more similar than RID4 in score buffer 4 and is saved in score buffer 5.

When a similarity search is executed by the similarity search engine, each document in the hierarchical database is scored against the search criteria submitted with the search according to the scoring method selected by the user (or if none is selected, the default scoring method that is part of the schema). As shown above in FIG. 21*a*, each document is broken down into parent/child objects and organized into data bands and relation bands according to the search criteria. The execution, scoring and parent score computing algorithm (score summing) are performed in a virtual machine that controls the execution of the commands compiled by the SSE compiler. The commands are added to a work queue in the virtual machine, along with commands generated from other search requests. Using the examples in FIG. 21*a* through *m*, the data bands of FIG. 21*c* would require scoring against the search criteria using the scoring methods specified by the user (FIG. 21*f*). Because the data is organized into data bands, a command to score each value in the data band is executed by the virtual machine. Each value in the data band can be scored at the same time. For example, in FIG. 21*j* the values for 6'0 in the data band can be grouped and executed together to optimize system performance by reducing the number of times a band has to be loaded. In FIG. 21*f*, the scoring for the height, weight and hair color RIDs can be executed in parallel. The data bands then need to be score computed according to the parent score computing algorithm selected (FIG. 21*h*). Parent score computing (also called score summing) is the process that involves propagating the score for a particular child to its parent (FIGS. 21*g* and 21*m*). Every similarity search executed involves one or more parent score computing (score summing) operations. The number of parent score computing (score summing) operations is a function of the number of values in the data band and the number of parent/child categories. There are interdependencies between the various scoring and parent score computing (score summing) operations that control the order in which they are permitted to execute. A parent score computing (score summing) operation may not execute until all of its child operations have completed, however, sibling parent score computing (score summing) operations may execute independently of one another. For example, as shown in FIG. 21*f*, the parent score computing (score summing) of height, weight and hair color into the suspect parent category must occur before summing the resulting score for incident parent category.

In a highly concurrent single or multiprocessor system, multiple similarity searches that require scoring and parent score computing (score summing) may be executing or waiting to execute simultaneously. The scoring and parent score computing (score summing) can be can be coalesced by the using the context of the relation band that the scores represent. By coalescing, it is meant that concurrent operations that occur within the same data band for scoring and within the same relation bands for parent score computing (score summing) are combined into a single operation for execution by the execution and scoring virtual machine within the similarity search engine regardless of the measure, weighting and parent score computing algorithm. For example, if there are one hundred searches that are executing simultaneously, and each search involves a thread (or set of processing steps) for performing a parent score computing (score summing) operation within the relation band context of "Incident/Suspect/Name". Without coalescing, one hundred threads (or sets of processing step) of execution would have to occur where each thread would iterate of the "Incident/Suspect/Name" band to perform the parent score computing (score summing) process. With coalescing based on band context, the one hundred threads can be iterated once over the band. Although both sequential and parallel processing require the same number of child and parent score buffers as input, the number of iterations is reduced and the number of times it exists in memory is also reduced.

Figure 22:
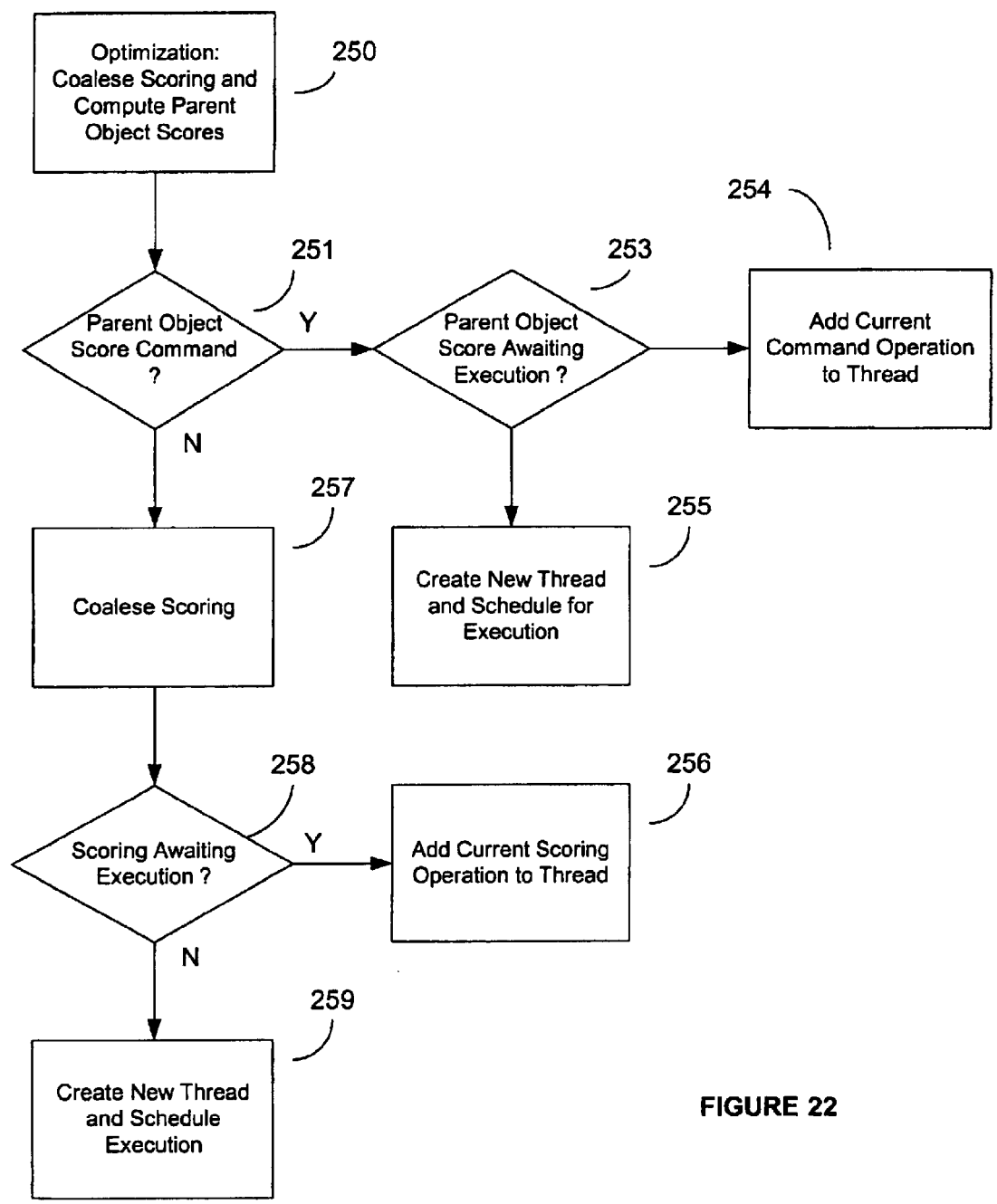
FIG. 22 is a flowchart of the optimizing scoring and computing parent object score processes.

FIG. 22 is a flowchart of the optimizing scoring and computing parent object score process 250 by coalescing the present command with a command waiting to be executed. If the command is a computing parent object score request (score summing) 251 and a computing parent object score request score for this relation band is waiting to execute 253, the current command operation is added to the existing thread for this context (coalesced) if resources permit (for example, score buffers are available). A global table exists which identifies the parent object threads for each relation band context waiting to be executed. If a compute parent object score entry for this relation band context exists in the global table 253, then the current parent object score operation is coalesced or added to this thread 254. Execution of the threads by the SSE VM will then occur at the same time if resources permit. If a compute parent object score entry for this context does not exist in the global table 253, then a new thread is created and scheduled for execution 255. If the operation is for scoring 257, then a check is made in a global scoring table to determine if a scoring operation for this data band is waiting to execute 258. If so, the current scoring operation is added to the thread 256 if there are resources available. Execution of the scoring threads will then occur at the same time if resources permit. If a scoring entry does not exist in the global table for this data band 258, then a new thread is created and scheduled for execution 259.

Figure 23:
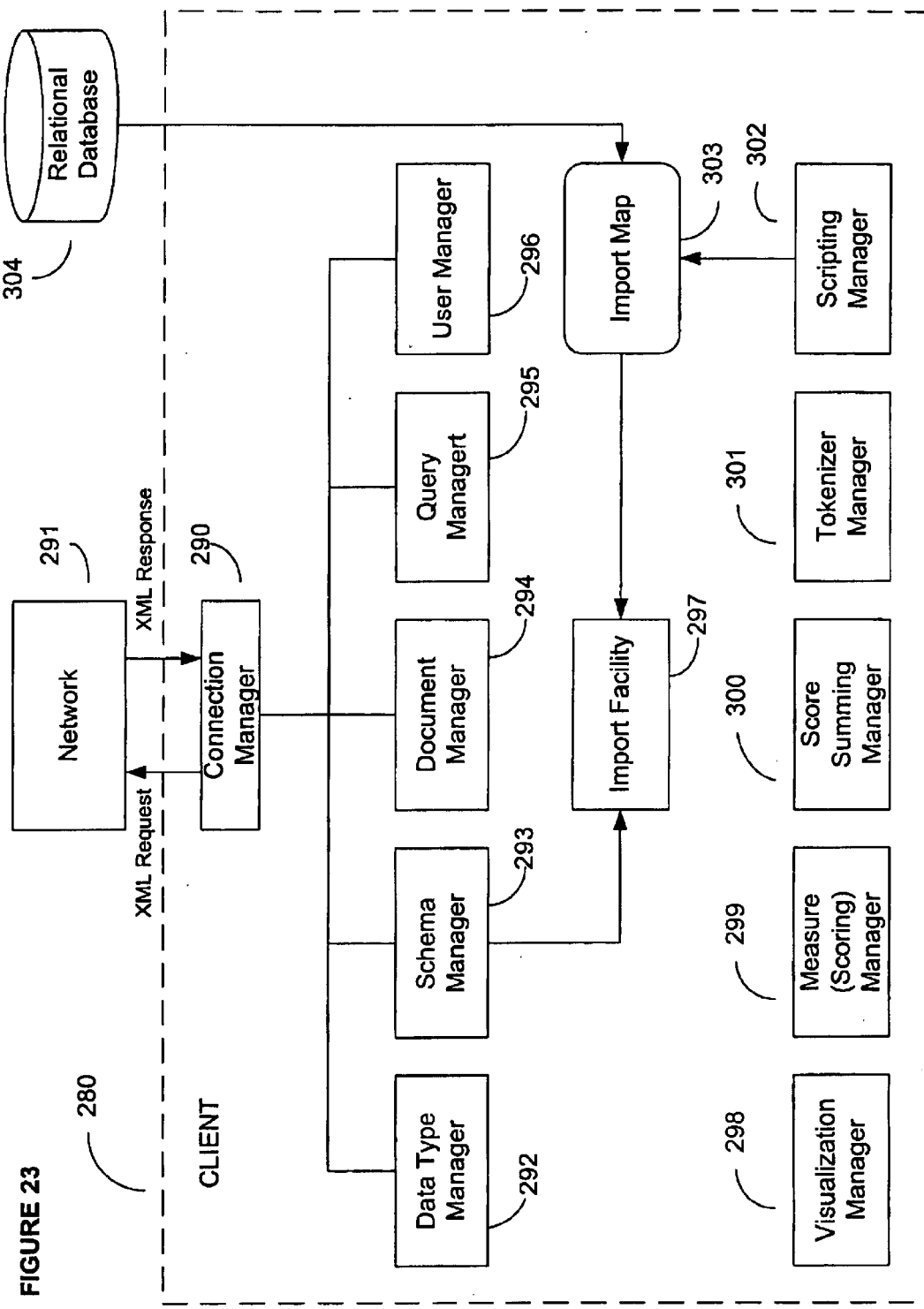
FIG. 23 is a diagram of the client functions of the similarity search engine system in a networked client-server computer configuration.

FIG. 23 is a diagram of the client functions of the similarity search engine computer system in a networked client-server computer configuration. The client query, user administration, data base import and schema creation functions exist within the client. As shown in FIGS. 1 and 5, the client may exist on a single computer server or may be spread across multiple computer platforms. Likewise, the client may exist in a standalone configuration as shown in FIG. 6. The client contains a connection manager 290. The connection manager 290 manages the interface to the similarity search engine server. In the networked client-server computer configuration shown in FIG. 20, the connection manager 290 maintains a logical connection to the network or gateway 291. If the hierarchical database language XML is used, as shown in FIGS. 1 and 5, the connection manager sends XML request and receives XML responses, maintains the current user state information, maintains a connection with the network and authenticates all calls to the client. The data type manager 292 acts as a repository for data type information. It retrieves stored data types and saves data types to disk and maintains a list of all available data types. It allows the user to print data types. The schema manager 293 allows the user to build and save schemas and to load existing schemas stored on disk. The document manager 294 acts as a central point for saving and retrieving documents. It is connected to an import facility function 297 which allows the documents to be imported from an existing relational database 304 using an import map 303 and a scripting engine 302. The scripting engine 302 processes scripts that allow for the cleanup of the database by transforming the text and fields of the data. For example, the database may have the text entry November, and for ease of searching, it may be desirable to convert the month to its number designation 11. The scripting engine can process any type of script to cleanup database data. The query manager 295 acts as the central point for issuing queries to the similarity search engine server. It generates the commands necessary to issue a similarity and document compare query. The scoring method manager 299 allows the user to choose scoring methods, and build and save scoring methods when creating a schema. The score-summing manager 300 allows parent score computing (score summing) results to be saved within the client function. These results may also be saved in the similarity search engine server. The tokenizer manager 301 provides a central point of reference for tokenizers within the system that break the text down into their semantically relevant parts.

Figure 24:
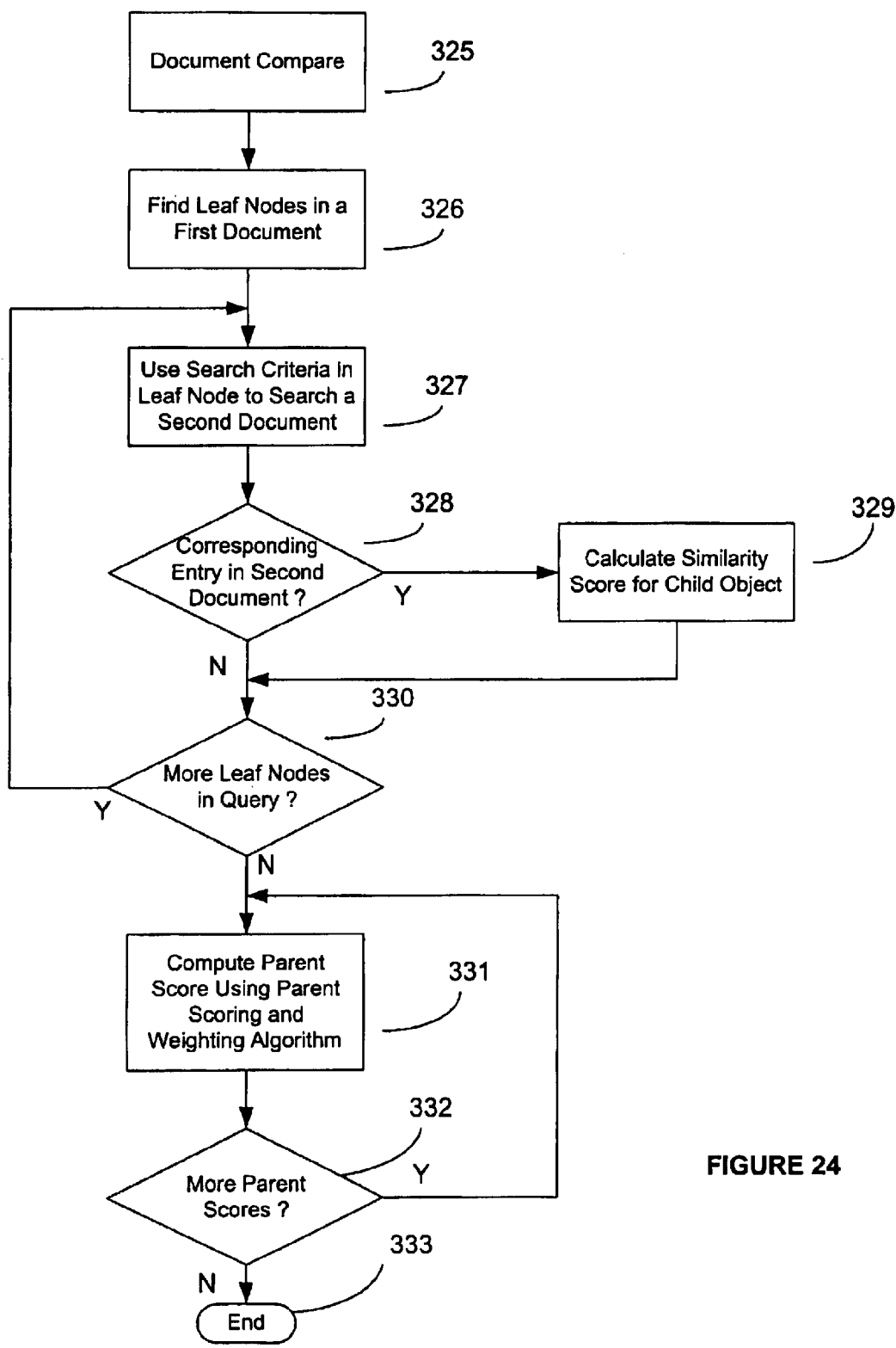
FIG. 24 is a flowchart of the document comparison function.

FIG. 24 is a flowchart of the document comparison function 325. A first document in a hierarchical language may be annotated with a scoring method or algorithm (measure), weighting and parent scoring algorithm, the annotated first document becoming a query which is used to search a second document. The query is stored in a hierarchical language format having parent and child objects. A child object that has no children, is called a leaf node. The document compare function "walks through" the query and finds leaf nodes in the query that contain the search criteria 326. The query (or alternatively the schema associated with the document) may also specify a scoring method or algorithm (called a measure) to be used for scoring similarity, the weighting to be used for child categories within a parent and a parent scoring algorithm to be used to compute parent scores for their children's scores. A second document to be searched is also in a hierarchical language format containing parent and child objects. Using the search criteria in the query leaf node, the second document is examined to determine if the search criteria in the leaf node is found within an object in the document 327. If a corresponding entry in the second document is found 328, a similarity score for the child object is calculated based on the specified scoring method or algorithm 329. If there are more leaf nodes in the query to process 330, the process is repeated for all leaf nodes (steps 327 through 329). If there are no more leaf nodes in the query to process 330, parent scores are computed using the parent scoring algorithm 331 and the process is repeated 332 until a single overall parent score is computed and processing ends 333. Alternatively, the order of the processing may be different, for example, all the leaf node scores do not have to be processed before parent scores are computed. Some leaf nodes may be processed and their parent scores computed and then more leaf node processed and their parent scores computed, etc. The order of processing is not important so long as a parent's child objects are scored before the parent score is computed. In any case, all the children scores at all levels are annotated and saved and may be viewed by the user along with the single overall parent score for the highest parent object called a leaf root. Any weighting specified in the query is also used by the parent scoring algorithm to determine the weight to be given to the individual child scores when they are used to compute their parent scores.

FIG. 25 shows an example of a graphical user interface displaying the results of a document comparison similarity search. It shows the side by side display of the document comparison search result for two documents. The document labeled anchor 340 is the first document in a hierarchical language that is annotated with a scoring method or algorithm.(measure), weighting and parent scoring algorithm, the annotated first document becoming a query which is used to search a second document. The score 341 represents the similarity search results as specified by the scoring method for between the objects of the first and second document.

Figure 26:
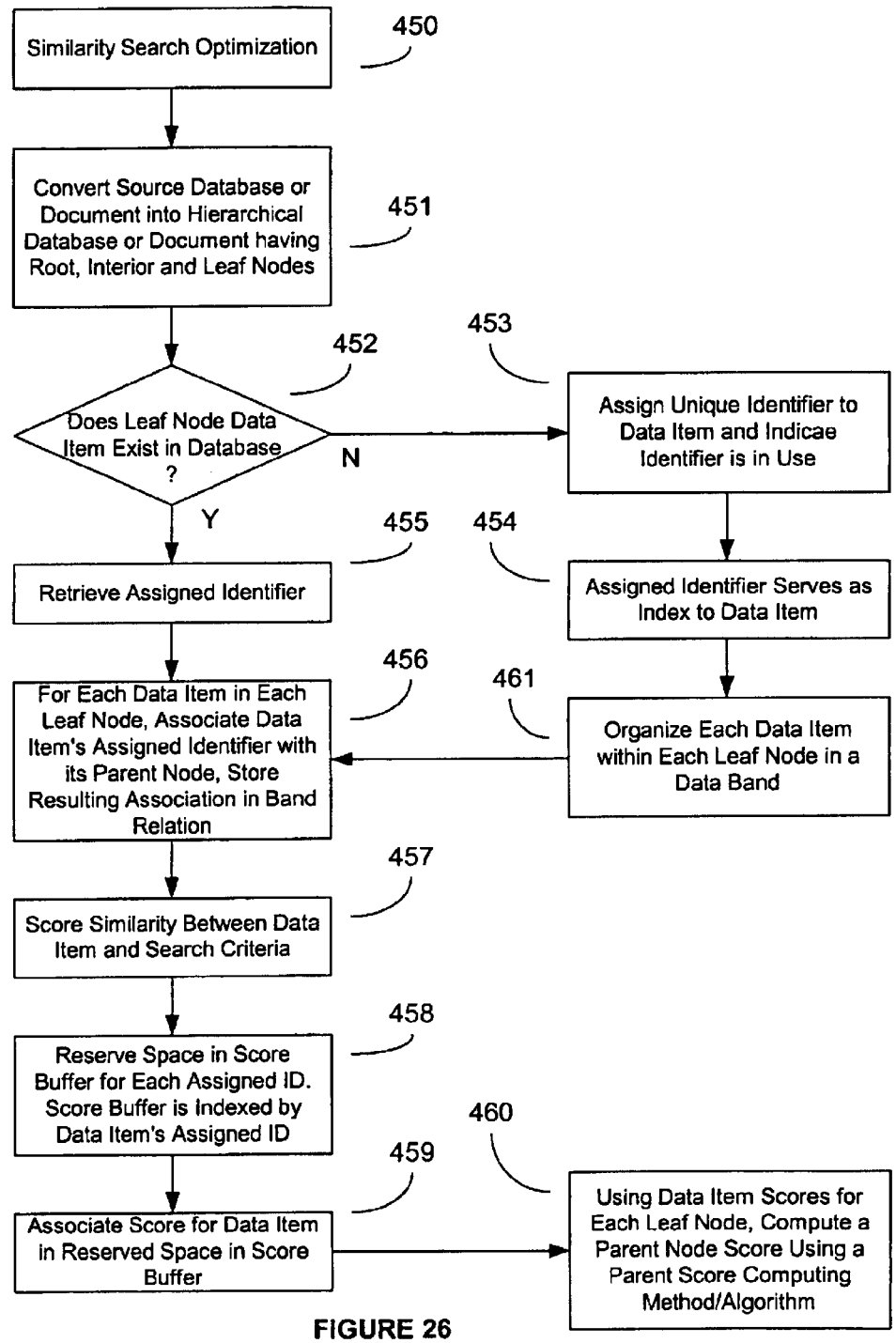
FIG. 26 is a flowchart showing the similarity search optimization method.

FIG. 26 is a flowchart showing the similarity search optimization method 450. Source database documents are converted into hierarchical database documents having root, interior and leaf nodes 451. The documents will have at least one root node and one leaf node. Alternatively, the documents have already been converted into a hierarchical form, and if so, step 451 is omitted and processing continues in step 452. If the leaf nodes data item doe not already exist in the hierarchical database within a selected context 452, meaning that the leaf node data item is unique, a unique identifier is assigned to the data item and the identifier is indicated as in use 453. The assigned unique identifier 454 may serve as an index to the data item, although this is not required. The data items within each leaf node may be organized into a data band 461. If the leaf node data item already exists in the hierarchical database 452, meaning that the data item is not unique, the assigned identifier for that data item is retrieved 455. For each data item in each leaf node, the data item is then associated with its parent node 456. The resulting association may then be stored in a relation band. The similarity between each data item and a search criteria 457 is scored. Space may have been reserved in a score buffer for each assigned identifier and the score buffer may be indexed by the data item's assigned identifier 458, although this is not required. The data item score for each leaf node is associated with space reserved in the score buffer 459. Using the data item scores for each leaf node, a parent nodes score is computed using a parent score computing algorithm 460.

Figure 27:
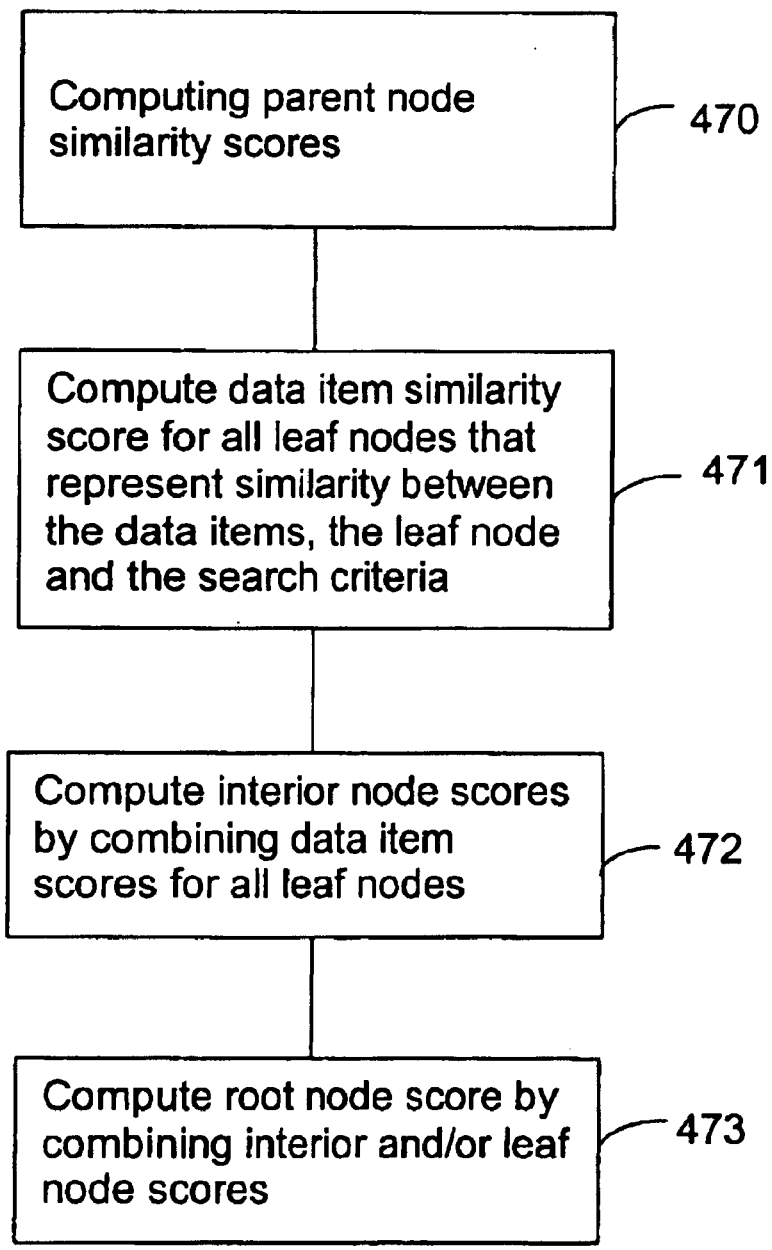
FIG. 27 is a flow diagram of one method of computing a parent node similarity score.

FIG. 27 is a flow diagram of one method of computing a parent node similarity score 470. A data item similarity score for all leaf nodes that represents the similarity between the data item in the leaf node and a search criteria 471 is computed. Interior node scores, if interior nodes exist, are computed by combining data item scores for all leaf nodes that are children of the interior nodes 472. A root node score is computed by combining interior and /or leaf nodes scores 473. The root node score represents the final similarity search score for the designated context.

Figure 28:
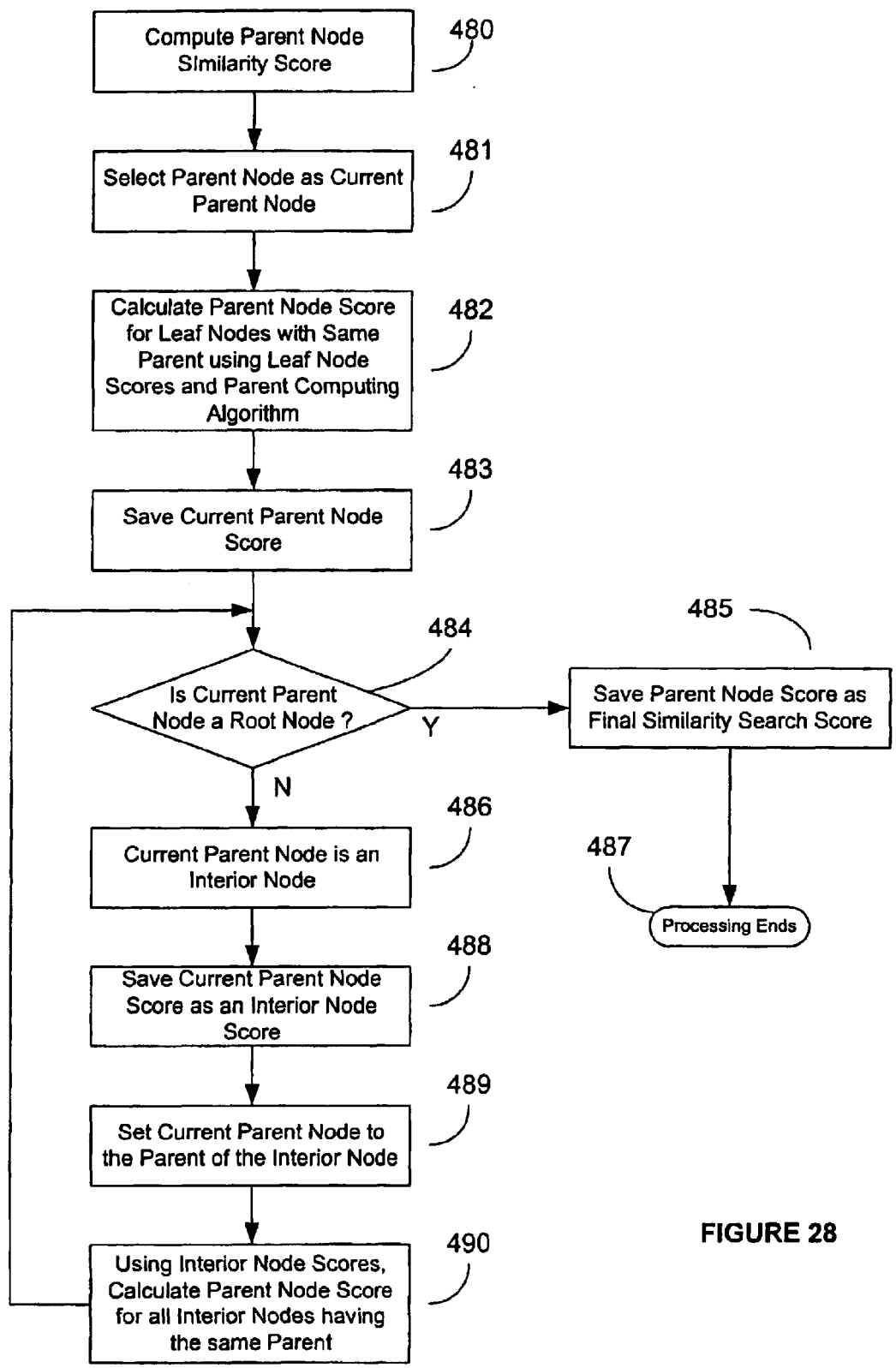
FIG. 28 is a flow diagram of another method of computing a parent node similarity score.

FIG. 28 is a flow diagram of another method of computing a parent node similarity score 480. A parent node (meaning a node that has child nodes) is selected as the current parent node 481. A parent nodes score is calculated for all leaf nodes having the same parent using the leaf nodes scores already computed and a parent score computing method/algorithm 482. The current parent node score is saved 483. If the current parent node is a root node 484, then the parent node score is saved as the final similarity search score 485 and processing ends 487. If the current parent node is not a rood node 484, then the current parent node is an interior node 486. The current parent nodes score is saved as an interior node score 488. The current parent node is set to the parent of the interior node 489. Using the saved interior nodes scores, a parent nodes score is calculated for all interior nodes having the same parent using a parent score computing method/algorithm 490. Processing then continues at step 484 until the current parent node is a root node.

Figure 29:
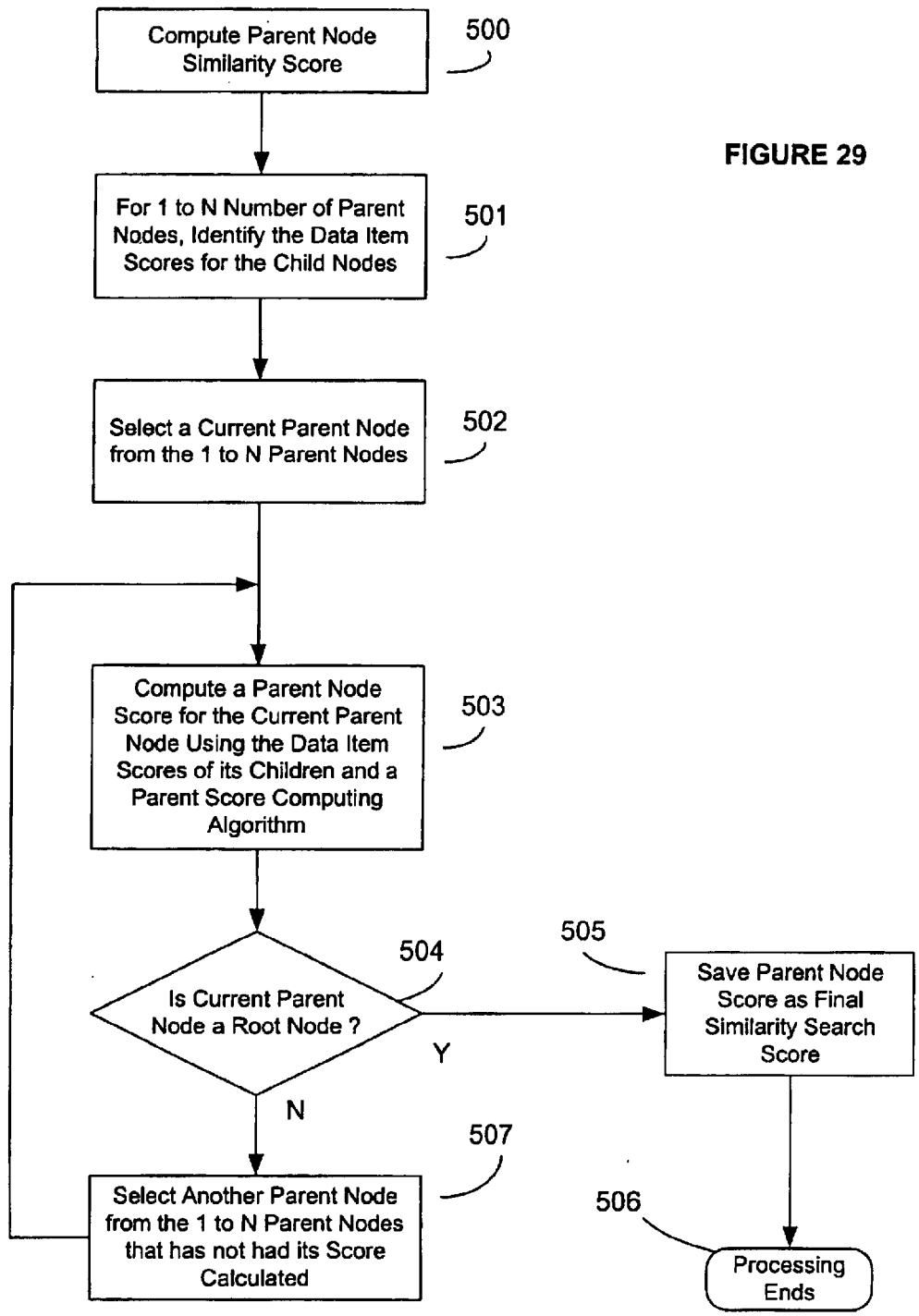
FIG. 29 is a flow diagram of another method of computing a parent node similarity score.

FIG. 29 is a flow diagram of another method of computing a parent node similarity score 500. For 1 to N number of parent nodes, using the relation band, identify the data item scores for the child nodes 501. Select a current parent node from the 1 to N parent nodes 502. Compute a parent node score for the current parent node using the data item score(s) of its child(ren) and a parent score computing method/algorithm 503. If the current parent node is a rood node 504, the parent nodes score is saved as the similarity search score 505 and processing ends 506. If the current parent nodes is not the root node 504, another parent node is selected from the 1 to N parent nodes that have not have their scores calculated 507 and processing continues at step 503.

Figure 30:
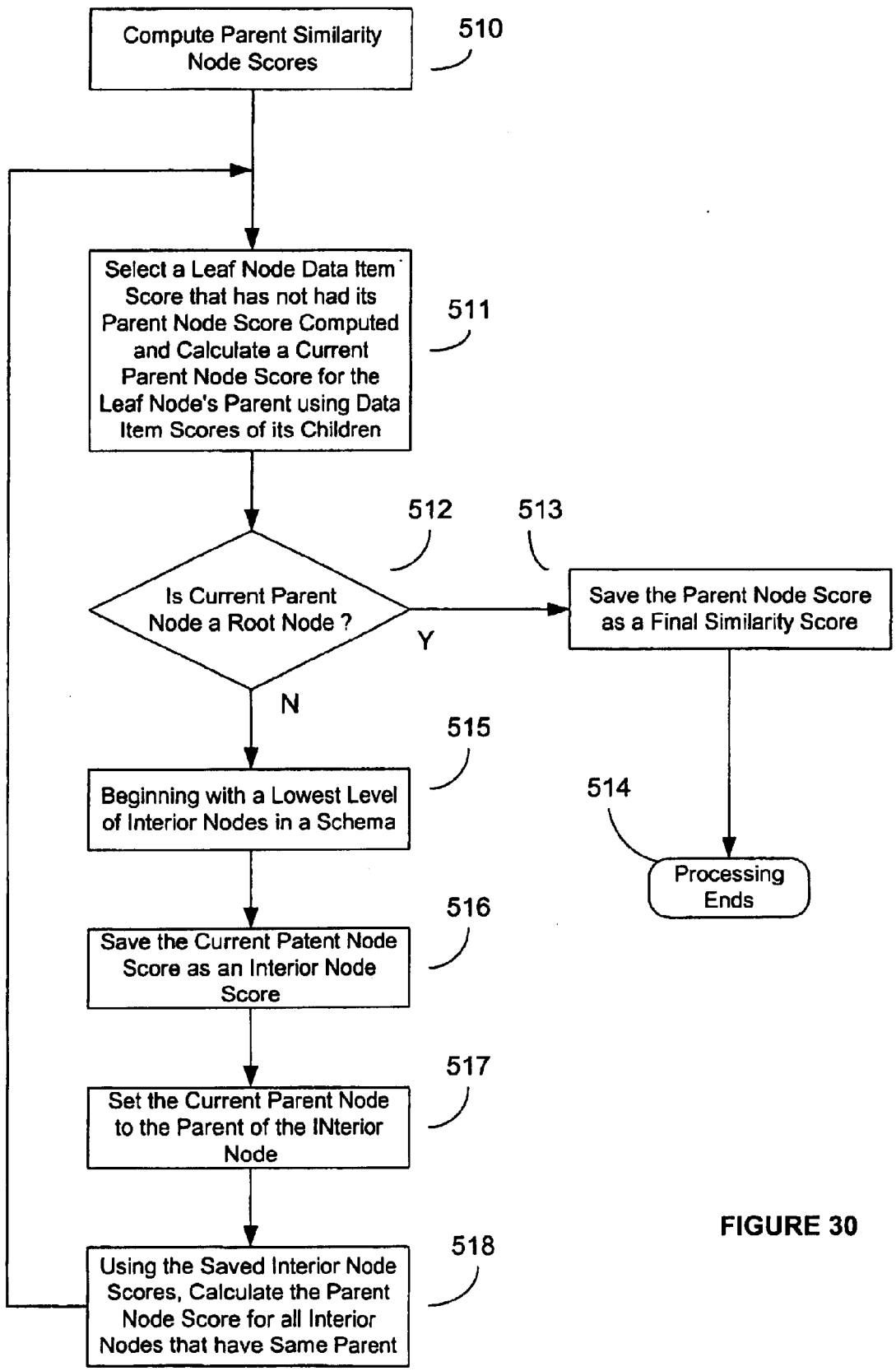
FIG. 30 is a flow diagram of another method of computing a parent node similarity score.

FIG. 30 is a flow diagram of another method of computing a parent node similarity score 510. A leaf node data item score that has not had its parent node score computed is selected and a current parent nodes score is calculated for the leaf node's parent using the data item scores for the current parent node's children 511. If the current parent node is a root node 512, the parent node score is saved as a final similarity score 513 and processing ends. If the current parent node is a root node 512, beginning with a lowest level of interior nodes in a schema 515, the current parent node score is saved as an interior nodes score 516. The current parent node is set to the parent of the interior node 517. Using the saved interior node scores, the parent node score is calculated for all interior nodes that have the same parent 518. Processing continues at step 511 until the current parent node is the root node 512.

Using the foregoing, the invention may be implemented using standard programming or engineering techniques including computer programming software, firmware, hardware or any combination or subset thereof. Any such resulting program, having a computer readable program code means, may be embodied or provided within one or more computer readable or usable media, thereby making a computer program product, i.e. an article of manufacture, according to the invention. The computer readable media may be, for instance a fixed (hard) drive, disk, diskette, optical disk, magnetic tape, semiconductor memory such as read-only memory (ROM), or any transmitting/receiving medium such as the Internet or other communication network or link. The article of manufacture containing the computer programming code may be made and/or used by executing the code directly from one medium, by copying the code from one medium to another medium, or by transmitting the code over a network.

An apparatus for making, using or selling the invention may be one or more processing systems including, but not limited to, a central processing unit (CPU), memory, storage devices, communication links, communication devices, server, I/O devices, or any sub-components or individual parts of one or more processing systems, including software, firmware, hardware or any combination or subset thereof, which embody the invention as set forth in the claims.

User input may be received from the keyboard, mouse, pen, voice, touch screen, or any other means by which a human can input data to a computer, including through other programs such as application programs.

Although the present invention has been described in detail with reference to certain preferred embodiments, it should be apparent that modifications and adaptations to those embodiments may occur to persons skilled in the art without departing from the spirit and scope of the present invention as set forth in the following claims.

What is claimed is:

1. A computer implemented method for optimizing similarity searching while detecting and scoring similarities between documents and a search criteria comprising:
    a. using a set of hierarchical documents having root, interior and leaf nodes, wherein the leaf nodes contain data items;
    b. using assigned unique identifiers assigned to each unique data item contained within each leaf node in the set of documents, wherein each associated unique identifier, unique data item and leaf node are entered into a data structure called a data band, the unique identifiers being unique within a selected context in the set of hierarchical documents;
    c. for each data item in each leaf node, computing a data item numerical score that represents a quantitative measure of the similarity between the data item in the leaf node and the search criteria using a scoring method; and
    d. using parent score computing and weighting algorithms, computing interior and root node scores from the leaf node data item similarity scores;
    e. whereby the search criteria is created by a user for specifying a scoring method, parent score algorithm, weighting algorithms, and indices linking each root, interior and leaf node connection.

2. The method of claim 1 wherein:
    the root node has no parent node and the root node is a parent of at least one child node selected from the group consisting of interior nodes and leaf nodes;

the interior node has a parent node and the interior node is itself a parent node having at least one child node selected from the group consisting of interior nodes and leaf nodes; and the leaf node is a child node that has no children and the leaf node has a parent node selected from the group consisting of root nodes and interior nodes.

3. The method of claim 2 further comprising computing a parent node score by combining the data item scores for all its child nodes.

4. The method of claim 3 further comprising assigning an identifier to each parent node.

5. The method of claim 2 further comprising a schema having a hierarchy, wherein the schema defines a hierarchy of parent and child nodes within a set of hierarchical documents and an organization of the set of hierarchical documents.

6. The method of claim 5 further comprising a node label assigned to each node in the schema.

7. The method of claim 5 further comprising, converting at least one document into at least one hierarchical document having root, interior and leaf nodes, wherein said root, interior and leaf nodes correspond to the schema.

8. The method of claim 7 wherein the converting comprises allowing a user to map between the schema and documents in a preexisting database to form the set of hierarchical documents.

9. The method of claim 8 wherein the preexisting database is a relational database.

10. The method of claim 5 further comprising, converting at least one document into at least one hierarchical document having at least one root node and at least one leaf node, wherein said root and leaf nodes correspond to the schema.

11. The method of claim 5 wherein the schema is defined by a user.

12. The method of claim 5 wherein the schema is retrieved from a database containing stored schemas.

13. The method of claim 5 wherein the schema further comprises:
  a. a scoring method for calculating a leaf node score for each leaf node;
  b. a weighting algorithm for calculating a parent node score for each leaf node when the parent node contains more than one leaf node;
  c. a parent score computing algorithm for computing the similarity score of the parent node using the leaf node scores and the weighting algorithm.

14. The method of claim 2 further comprising computing an interior node score for all interior nodes by combining the scores for all the child nodes of the interior nodes.

15. The method of claim 14 further comprising computing a root node score by combining the interior node scores for the children of the root node.

16. The method of claim 1 wherein the context for a node is its position in the schema.

17. The method of claim 1 wherein the context for a node is the set of node labels that comprise its position in the schema.

18. The method of claim 1 further comprising:
  reserving space in a score buffer for each assigned unique identifier; and
  associating the score for the data item for each assigned unique identifier with its reserved space in the score buffer.

19. The method of claim 18 wherein the score buffer is indexed by the data item's assigned unique identifier.

20. The method of claim 18 wherein the assigned unique identifier serves as an index to the data item.

21. The method of claim 20 further comprising identifying the child nodes belonging to each parent node.

22. The method of claim 21 wherein the identifying comprises associating the data item's assigned unique identifier for each leaf node with its parent's assigned identifier and saving a resulting association.

23. The method of claim 22 wherein the resulting association is stored in a relation band.

24. The method of claim 21 wherein the identifying comprises associating the child node with its parent node.

25. A computer-readable data transmission medium containing an association between parent and child nodes as recited in claim 24.

26. The method of claim 18 wherein the assigned unique identifier is the same for all identical data items for a selected context within the hierarchical database.

27. The method of claim 26 wherein the context is selected from the group consisting of its position in the schema and the set of node labels.

28. The method of claim 18 wherein the data item score is a number that represents how similar and dissimilar the data item is to the search criteria.

29. The method of claim 28 wherein the number representing the data item score is assigned based on a method selected from the group consisting of an algorithmic scoring method and a non-algorithmic scoring method.

30. The method of claim 29 wherein if the scoring method is a non-algorithmic scoring method and if the data item does not match the search criteria, assigning as the data item score a value that represents a neutral score.

31. The method of claim 29 wherein if a non-algorithmic scoring method is chosen generates a set of data values along with data item scores.

32. The method of claim 31 wherein if a data item occurs within this set, the data item's unique identifier is associated with its corresponding score.

33. The method of claim 32 wherein the non-algorithmic scoring method uses a user-defined table of data items, their corresponding synonyms and their scores.

34. The method of claim 31 wherein if the data items are not in this set, the data items are assigned a neutral score.

35. The method of claim 1 further comprising:
  a. for all the data items in the set of hierarchical documents, organizing each data item in a data band according to its position in the schema and associating each data item's assigned unique identifier with the data item and storing the association in the data band; and
  b. for each child node in the set of hierarchical documents, linking each node with its parent node using a relation band according to its position in the schema, where the parent node is selected from the group consisting of interior nodes and root nodes.

36. The method of claim 35 wherein computing a data item score comprises calculating a leaf node score for each data item within each leaf node, combining all the data item scores within the leaf node into an overall leaf node score and saving the overall node score as the leaf node score.

37. The method of claim 36 wherein the leaf node score is saved in a leaf score buffer.

38. The method of claim 37 further comprising indexing the leaf score buffer by the data item's assigned unique identifier.

39. The method of claim 36 further comprising using the assigned unique identifier as an index to the data item.

40. The method of claim 36 further comprising:
   a. using the saved leaf node scores, selecting a parent node as the current parent node and calculating a current parent node score for all leaf nodes that have the same parent using a parent score computing algorithm and saving the current parent node score;
   b. if the current parent node is a root node, saving the parent node score as a final similarity search score and processing ends; and
   c. if the current parent node is an interior node:
      i. saving the current parent node score as an interior node score;
      ii. setting the current parent node to the parent of the interior node;
      iii. using the saved interior node scores, calculating the parent node score for all interior nodes that have the same parent using a parent score computing algorithm; and
      iv. repeating steps b and c until the current parent node is a root node.

41. The method of claim 40 further comprising making the final similarity score available for display.

42. The method of claim 40 further comprising associating the leaf and interior nodes with their parent nodes using the relation band.

43. The method of claim 40 wherein the parent score computing algorithm comprises determining the weight to be given to each leaf node score in calculating the current parent node score.

44. The method of claim 40 wherein the parent score computing algorithm is selected from the group consisting of single best, greedy sum, overall sum, greedy minimum, overall minimum and overall maximum.

45. Computer-readable media having computer-executable instructions for performing the method as recited in claim 40.

46. The method of claim 35 further comprising calculating a root node score for each root node within the set of hierarchical documents comprising:
   a. using the relation bands, for 1 to N parent nodes, identifying the data item scores for their child nodes of the 1 to N parent nodes;
   b. selecting a current parent node from the 1 to N parent nodes;
   c. computing a parent score for the current parent node using the data item scores of its children and a parent score computing algorithm and saving the parent node score;
   d. if the current parent node is a root node, saving the parent node score as the similarity search score and processing ends;
   e. if the current parent node is not a root node, selecting another current parent node from the 1 to N parent nodes that has not had its score calculated and repeating steps c and d.

47. The method of claim 35 wherein computing a data item score comprises:
   a. using a search criteria; and
   b. comparing each data item to the search criteria and assigning a data item score that represents a degree of similarity between the search criteria and the data item.

48. The method of claim 1 further comprising for all data items in the set of hierarchical documents, organizing each data item within each leaf node in a data band according to its position in the schema and associating each data item's assigned unique identifier with the data item and storing the association in the data band.

49. The method of claim 48 wherein computing a data item score comprises calculating a leaf node score for each data item, combining all the data item scores within the leaf node into an overall leaf node score and saving the overall node score as the leaf node score.

50. The method of claim 1 wherein the search criteria is dynamically defined by a user.

51. The method of claim 1 wherein the search criteria is retrieved from a database of stored queries.

52. The method of claim 1 further comprising using the same search criteria and repeating steps a and b for each of N number of sets of hierarchical documents.

53. The method of claim 52 further comprising displaying the results for the N number of sets of hierarchical documents to a user.

54. The method of claim 1 wherein the hierarchical documents are stored in Extensible Markup Language (XML).

55. Computer-readable media having computer-executable instructions for performing the method as recited in claim 1.

56. A computer data signal embodied in a transmission medium for optimizing similarity searching while detecting and scoring similarities between documents and a search criteria comprising:
   a. a first portion identifying a set of hierarchical documents having root, interior and leaf nodes, wherein the leaf nodes contain data items that a client computer is requesting from a server;
   b. a second portion identifying assigned unique identifiers assigned to each unique data item contained within each leaf node in the set of documents that a client computer is requesting from a server, wherein each associated unique identifier, unique data item and leaf node are entered into a data structure called a data band, the unique identifiers being unique within a selected context in the set of hierarchical documents;
   c. a third portion identifying a session for computing a data item numerical score that represents a quantitative measure of the similarity between each data item in each leaf node and the search criteria using a scoring method requested by the client computer during the identified session; and
   d. a fourth portion identifying parent score computing and weighting algorithms for computing interior and root node scores from the leaf node data item similarity scores;
   e. whereby the search criteria is created by a user for specifying a scoring method, parent score algorithm, weighting algorithms, and indices linking each root, interior and leaf node connection.

57. A computer system for optimizing similarity searching while detecting and scoring similarities between documents and a search criteria comprising:
   a. a set of hierarchical documents that are to be similarity searched, the documents having root, interior and leaf nodes, wherein the leaf nodes contain data items,
   b. a unique identifier component having unique identifiers that are assigned to each unique data item contained within each leaf node in the set of documents, wherein each associated unique identifier, unique data item and leaf node are entered into a data structure called a data band, the unique identifiers being unique within a selected context in the set of hierarchical documents;

c. a data item score component that computes a data item numerical score for each data item in each leaf node, the score representing a quantitative measure of the similarity between the data item in the leaf node and the search criteria using a scoring method; and
d. parent score computing and weighting algorithms for computing interior and root node scores from the leaf node data item similarity score;
e. whereby the search criteria is created by a user for specifying a scoring method, parent score algorithm, weighting algorithms, and indices linking each root, interior and leaf node connection.

* * * * *